(12) United States Patent
Goel et al.

(10) Patent No.: US 9,177,351 B2
(45) Date of Patent: Nov. 3, 2015

(54) MULTI-PRIMITIVE GRAPHICS RENDERING PIPELINE

(71) Applicant: QUALCOMM Incorporated, San Diego, CA (US)

(72) Inventors: Vineet Goel, Winter Park, FL (US); Young In Yeo, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 13/842,017

(22) Filed: Mar. 15, 2013

(65) Prior Publication Data

US 2014/0098117 A1  Apr. 10, 2014

Related U.S. Application Data

(60) Provisional application No. 61/711,693, filed on Oct. 9, 2012.

(51) Int. Cl.
G06T 15/00  (2011.01)
G06T 1/20  (2006.01)
G06T 17/20  (2006.01)

(52) U.S. Cl.
CPC .................. *G06T 1/20* (2013.01); *G06T 15/005* (2013.01); *G06T 17/20* (2013.01)

(58) Field of Classification Search
None
See application file for complete search history.

(56) References Cited

U.S. PATENT DOCUMENTS

| 6,337,689 | B1 | 1/2002 | Hochmuth et al. | |
|---|---|---|---|---|
| 6,362,825 | B1 | 3/2002 | Johnson | |
| 6,469,704 | B1 | 10/2002 | Johnson | |
| 6,483,505 | B1 | 11/2002 | Morein et al. | |
| 2005/0195188 | A1 | 9/2005 | Goel et al. | |
| 2006/0050072 | A1 | 3/2006 | Goel | |
| 2010/0164955 | A1 | 7/2010 | Sathe et al. | |
| 2010/0164983 | A1 | 7/2010 | Lawrence et al. | |
| 2010/0214294 | A1 | 8/2010 | Li et al. | |
| 2011/0090220 | A1* | 4/2011 | Molnar et al. | 345/420 |
| 2011/0310102 | A1* | 12/2011 | Chang | 345/423 |
| 2012/0050303 | A1 | 3/2012 | Mcallister et al. | |
| 2012/0299920 | A1* | 11/2012 | Coombe et al. | 345/423 |

OTHER PUBLICATIONS

Microsoft, "Getting Started with the Input-Assembler Stage (Direct3D 10)" http://msdn.microsoft.com/en-us/library/windows/desktop/bb205117(v=VS.85).aspx, Nov. 28, 2011.*

(Continued)

*Primary Examiner* — Kee M Tung
*Assistant Examiner* — Nicholas R Wilson
(74) *Attorney, Agent, or Firm* — Shumaker & Sieffert, P.A.

(57) ABSTRACT

This disclosure describes techniques for rendering a plurality of primitives that includes at least two different types of primitives during the execution of a single draw call command. This disclosure also describes techniques for rendering a plurality of primitives using tessellation domains of different tessellation domain types during the execution of a single draw call command. The techniques of this disclosure may, in some examples, reduce the complexity and processing overhead for user applications, reduce the number of times that the rendering state of the graphics rendering pipeline needs to be switched during the drawing of a graphics scene, and/or reduce the number of times that shader programs need to be reloaded into different processing stages of a graphics pipeline during the rendering of a graphics scene.

26 Claims, 12 Drawing Sheets

(56) References Cited

OTHER PUBLICATIONS

Kovacs et al., "Real-Time Creased Approximate Subdivision Surfaces," Proceedings of the 2009 Symposium on Interactive 3D Graphics and Games, I3D 2009, Feb. 27-Mar. 1, 2009, pp. 155-160 (6 pp).

Kovacs et al., "Real-Time Creased Approximate Subdivision Surfaces with Displacements," IEEE Transactions on Visualization and Computer Graphics, vol. 16, No. 5, Sep./Oct. 2010, pp. 742-751 (10 pp.).

International Search Report and Written Opinion from International Application No. PCT/US2013/058737 dated Feb. 24, 2015, 12 pages.

Jiang Q., et al., "Interpolatory Quad/Triangle Subdivision Schemes for Surface Design", Computer Aided Geometric Design, North-Holland, Amsterdam, NL, vol. 26, No. 8, Nov. 1, 2009, pp. 904-922, XP026600153, ISSN: 0167-8396, DOI: 10.1016/J.CAGD.2009.07.002 [retrieved on Jul. 4, 2009].

Kazakov M. et al., "Primitive Processing and Advanced Shading Architecture for Embedded Space", High Performance Graphics, ACM, 2 Penn Plaza, Suite 701 New York NY 10121-0701 USA, Aug. 5, 2011, pp. 169-176, XP058006594, DOI: 10.1145/2018323.2018350, ISBN: 978-1-4503-0896-0.

Ni T., et al., "Efficient substitutes for subdivision surfaces", ACM SIGGRAPH 2009 Courses, Aug. 5, 2009, pp. 1-107, XP055084843, New York, NY, USA, DOI: 10.1145/1667239.1667252.

Yeo Y. I. et al., "Efficient Pixel-accurate Rendering of Animated Curved Surfaces", Mathematical Methods for Curves and Surfaces, Lecture Notes in Computer Science, [Lecture Notes in Computer Science], Springer Verlag, DE, vol. 8177, Jun. 2012, XP047267626, pp. 491-509.

International Preliminary Report on Patentability from International Application No. PCT/US2013/058737, dated Apr. 23, 2015, 6 pages.

\* cited by examiner

MULTI-PRIMITIVE GRAPHICS RENDERING PIPELINE

This application claims the benefit of U.S. Provisional Application No. 61/711,693, filed Oct. 9, 2012, the entire content of which is incorporated herein by reference.

TECHNICAL FIELD

This disclosure relates to graphics processing systems, and more particularly, to the rendering of graphics primitives in a graphics processing system.

BACKGROUND

Computing devices often utilize a graphics processing unit (GPU) to accelerate the rendering of graphics data for display. Examples of such computing devices may include computer workstations, mobile phones (e.g., so-called smartphones), embedded systems, personal computers, tablet computers, and video game consoles. Rendering generally refers to the process of converting a three-dimensional (3D) graphics scene, which may include one or more 3D graphics objects, into two-dimensional (2D) rasterized image data. A GPU may include a 3D rendering pipeline to provide at least partial hardware acceleration for the rendering of a 3D graphics scene. The 3D graphics objects in a scene may be subdivided by a graphics application into one or more 3D graphics primitives (e.g., points, lines, triangles, patches, etc.), and the GPU may convert the 3D graphics primitives of the scene into 2D rasterized image data. Therefore, in the specific context of GPU rendering, rendering may refer to the process of converting 3D graphics primitives that correspond to 3D objects in a graphics scene into 2D rasterized image data.

SUMMARY

This disclosure describes graphics processing unit (GPU)-based techniques for rendering a plurality of primitives that includes at least two different types of primitives during the execution of a single draw call command. This disclosure also describes techniques for rendering a plurality of primitives using tessellation domains of different tessellation domain types during the execution of a single draw call command. As used herein, a primitive may refer to a group of one or more vertices and/or one or more control points that are grouped together and/or connected to define a geometric entity (e.g., point, line, polygon, surface, object, patch, etc.) for rendering by a GPU. A primitive type may define how vertices and/or control points are to be grouped together and/or connected to form a primitive for rendering. For example, a primitive type may specify how many control points are to be used to define a respective one of the primitives to be rendered. A tessellation domain may refer to an object that is subdivided by a tessellator of a graphics pipeline to generate a plurality of coordinates for use by one or more subsequent processing stages of the graphics pipeline. A tessellation domain type may define one or more attributes of the object (e.g., the shape of the object) that is to be subdivided by the tessellator.

By allowing multiple different primitive types to be rendered during the execution of a single draw call command and multiple different tessellation domain types to be used during the execution of a single draw call command, user applications do not necessarily need to perform separate draw call commands in order to render primitives of different types that are included in a single 3D object or mesh, which may, in some examples, reduce the complexity and processing overhead for user applications. In further examples, the techniques of this disclosure may reduce the number of times that the rendering state of the graphics rendering pipeline needs to be switched when rendering a graphics scene, thereby improving the rendering efficiency of the graphics processing system. In additional examples, the techniques of this disclosure may reduce the number of times that shader programs need to be reloaded into different processing stages of the pipeline when rendering a graphics scene, thereby providing further improvements in the rendering efficiency of the graphics processing system.

In one example, this disclosure describes a method that includes rendering, with a GPU, a plurality of primitives that includes at least two different types of primitives during execution of a draw call command.

In another example, this disclosure describes a device that includes a GPU configured to render a plurality of primitives that includes at least two different types of primitives during execution of a draw call command.

In another example, this disclosure describes an apparatus that includes means for executing a draw call command. The apparatus further includes means for rendering a plurality of primitives that includes at least two different types of primitives during execution of the draw call command.

In another example, this disclosure describes a computer-readable storage medium storing instructions that, when executed, cause one or more processors to render a plurality of primitives that includes at least two different types of primitives during execution of a draw call command.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
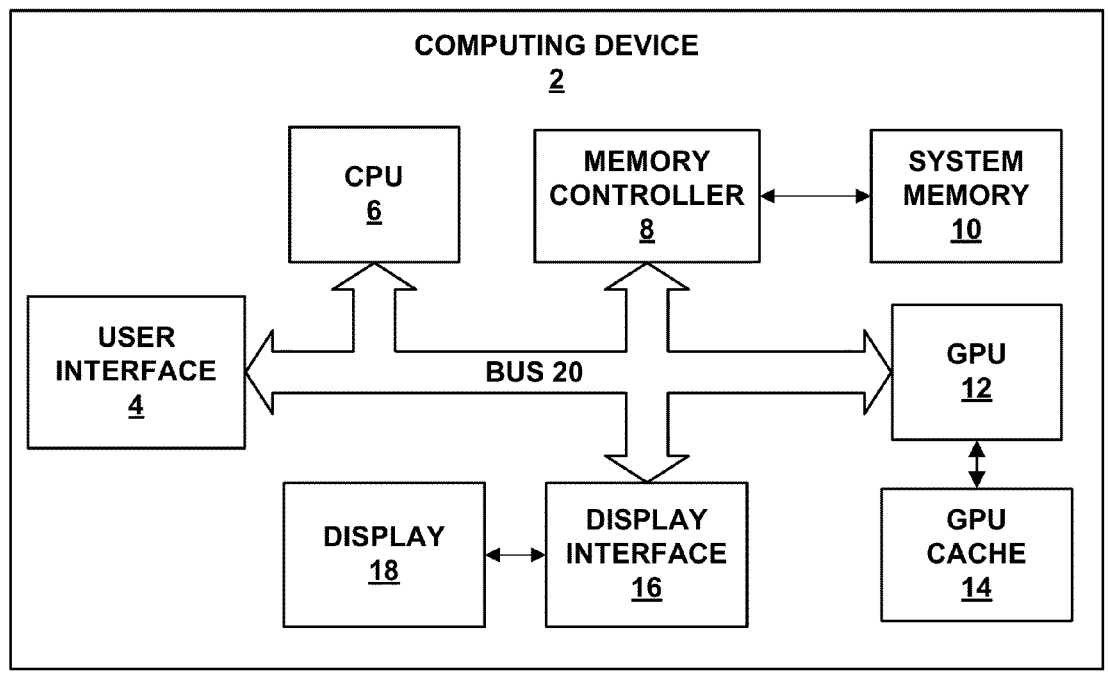
FIG. 1 is a block diagram illustrating an example computing device that may be used to implement the multi-primitive type rendering techniques of this disclosure and/or multi-tessellation domain type rendering techniques of this disclosure.

This disclosure describes graphics processing unit (GPU)-based techniques for rendering a plurality of primitives that includes at least two different types of primitives during the execution of a single draw call command. This disclosure also describes techniques for rendering a plurality of primitives using tessellation domains of different tessellation domain types during the execution of a single draw call command. As used herein, a primitive may refer to a group of one or more vertices and/or one or more control points that are grouped together and/or connected to define a geometric entity (e.g., point, line, polygon, surface, object, patch, etc.) for rendering by a GPU. A primitive type may define how vertices and/or control points are to be grouped together and/or connected to form a primitive for rendering. For example, a primitive type may specify how many control points are to be used to define a respective one of the primitives to be rendered. A tessellation domain may refer to an object that is subdivided by a tessellator of a graphics pipeline to generate a plurality of coordinates for use by one or more subsequent processing stages of the graphics pipeline. A tessellation domain type may define one or more attributes of the object (e.g., the shape of the object) that is to be subdivided by the tessellator.

By allowing multiple different primitive types to be rendered during the execution of a single draw call command and multiple different tessellation domain types to be used during the execution of a single draw call command, user applications do not necessarily need to perform separate draw call commands in order to render primitives of different types that are included in a single 3D object or mesh, which may, in some examples, reduce the complexity and processing overhead for user applications. In further examples, the techniques of this disclosure may reduce the number of times that the rendering state of the graphics rendering pipeline needs to be switched when rendering a graphics scene, thereby improving the rendering efficiency of the graphics processing system. In additional examples, the techniques of this disclosure may reduce the number of times shader programs need to be reloaded into different processing stages of the pipeline when rendering a graphics scene, thereby providing further improvements in the rendering efficiency of the graphics processing system.

Rendering may refer to the process of converting 3D graphics primitives that correspond to 3D objects in a graphics scene into 2D rasterized image data. A computing device may often utilize a graphics processing unit (GPU) that includes a 3D graphics rendering pipeline to accelerate the rendering of graphics primitives. A 3D graphics rendering pipeline may include a plurality of processing stages that are configured to render 3D graphics primitives. The processing stages may include programmable processing stages and fixed-function processing stages. Programmable processing stages may be configured to execute a user-specified program that may be compiled and loaded onto the GPU. Fixed-function processing stages may be hardwired to perform one or more functions, which may be configurable. Although the functions performed by the fixed-function processing stages may be configurable, the fixed-function processing stages are typically not capable of receiving and executing user-specified programs from a host processor.

To render one or more 3D graphics primitives of a particular primitive type, a user application executing on a host central processing unit (CPU) may set up the state of the GPU to render primitives of that particular type, and place geometry data corresponding to the primitives to be rendered into a GPU-accessible memory. Setting up the state of the GPU may involve issuing one or more state commands to the GPU that indicate a particular type of primitive that is to be rendered by the GPU and binding one or more types of shader programs to the GPU pipeline. The one or more types of shader programs may be configured to process data in a manner that is specific to the type of primitive to be rendered. If on-chip tessellation is being used to render the primitives, one or more of the shader programs that are bound to the GPU pipeline may specify a particular domain type (e.g., isoline, triangle, quad, etc.) to use for tessellation when rendering the primitives. Placing the geometry data into the GPU-accessible memory may involve, e.g., populating one or more vertex buffers in GPU-accessible memory with vertices and/or control points that correspond to the primitives to be rendered.

Once the state of the GPU has been set up to render primitives of a particular type and the geometry data corresponding to the primitives has been placed into the GPU-accessible memory, the user application executing on the host CPU may issue a draw call command to the GPU. In response to receiving the draw call command, the GPU may render the geometry that is stored in the GPU-accessible memory according to the current GPU state, which defines a particular primitive type to be used for processing the draw call instruction. If tessellation is used, the GPU may render the geometry using a particular tessellation domain type that is specified in one or more of the shader programs that were previously bound to the graphics pipeline.

If the CPU decides to render a primitive of a different type and/or to render a primitive using a tessellation domain of a different type, then the CPU may need to issue different draw calls for each of the different types of primitives to be rendered and/or for each of the different tessellation domain types to be used when rendering. Between the issuance of the different draw call commands, the CPU may need to set up the state of the GPU and bind new shader programs to the graphics pipeline in order to configure the pipeline to render a particular type of primitive that will be processed during the next draw call and/or to configure the pipeline to use a particular type of tessellation domain for rendering primitives during the next draw call. Thus, for GPUs that do not implement the techniques of this disclosure, rendering a scene that has primitives of different primitive types and/or that uses different tessellation domain types may result in a significant amount of processing overhead in terms of rendering pipeline state configuration and shader program configuration.

One example of where a scene that has different primitive types and/or that uses different tessellation domain types may arise is in when a 3D designer and/or modeler generates a mesh to model a 3D object to be rendered. In such examples, a single 3D mesh may include primitives of different primitive types, which may result in multiple draw call commands needing to be executed in order to render the mesh that represents the 3D object. For example, the original Proog and Emo meshes (from Blender's Elephant's Dream) include 32,118 (97.8%) quadrilaterals and 886 (2.7%) triangles.

If a mesh includes primitives of at least two different primitive types, a host processor (e.g., the CPU) may need to separate out the different primitive types into different groups so that the different primitive types can be rendered during different draw calls. This may add significant complexity and delay to user applications that need to draw complex 3D objects and meshes that have multiple different primitive types. Moreover, between each of the draw calls, the rendering state of the pipeline may need to be changed to support different primitive types and/or different tessellation domain types. In addition, different shader programs may need to be bound to the graphics pipeline to support different primitive types and/or different tessellation domain types. The switching of the rendering state between each of the draw call commands may consume a significant number of processing cycles, and therefore slow down the rendering of 3D meshes.

This disclosure describes techniques for rendering a plurality of primitives of different primitive types during the execution of a single draw call command. This disclosure also describes techniques for rendering a plurality of primitives using tessellation domains of different domain types during the execution of a single draw call command. By allowing multiple different primitive types to be rendered during the execution of a single draw call command and multiple different tessellation domain types to be used during the execution of a single draw call command, user applications do not necessarily need to perform separate draw call commands in order to render primitives of different types that are included in a single 3D object or mesh, which may reduce the complexity and processing overhead for user applications.

Moreover, the techniques of this disclosure may reduce the number of times that the rendering state of the pipeline needs to be switched between draw call commands, thereby improving the rendering efficiency of the graphics processing system. In addition, the techniques of this disclosure may reduce the number of times that shader programs need to be reloaded into different processing stages of the pipeline, thereby providing further improvements in the rendering efficiency of the graphics processing system.

According to some aspects of this disclosure, techniques are described for rendering a plurality of primitives of different primitive types during the execution of a draw call command. For example, a 3D graphics pipeline may render a first subset of a plurality of primitives that have a first primitive type during the execution of the draw call command, and render a second subset of the plurality of primitives that have a second primitive type during the execution of the same draw call command. The first primitive type may be different than the second primitive type. In some examples, the first primitive type may be a three control point patch and the second primitive type may be a four control point patch. In some examples, a primitive type may refer to a type of primitive that is capable of being received and processed by the graphics processing pipeline. In further examples, a primitive type may specify how many control points are to be used to define a respective one of the primitives to be rendered. Example primitive types may include points, lines, triangles, line lists, line strips, triangle lists, triangle strips, 2-control point patch lists, 3-control point patch lists, 4-control point patch lists, etc. In some examples, the primitive types may correspond to the Microsoft® DirectX 11 primitive topologies.

In some examples, the techniques of this disclosure may provide a 3D graphics pipeline that is configured to determine a primitive type associated with one or more vertices to be processed during the execution of a draw call command, and to configure one or more stages of the 3D graphics pipeline to process the vertices based on the primitive type during the execution of the draw call command. For example, the 3D graphics pipeline may receive primitive type data from one or more buffers associated with a plurality of vertices to be processed during a draw call command, and generate data that is indicative of the primitive type associated with each of the vertices to be processed. The data indicative of the primitive type associated with each of the vertices may be provided to one or more processing stages in the graphics rendering pipeline so that such stages may select appropriate data processing techniques for processing the received data based on the primitive type corresponding to the received data. In some examples, the data indicative of the primitive type associated with each of the vertices may be a system-generated value generated by an input assembler of the graphics processing pipeline.

In further examples, the techniques of this disclosure may provide a shader architecture and/or a shader programming model that allows different data processing techniques to be selected based on a primitive type associated with the data to be processed. The shader architecture and/or the shader programming model may correspond to the shader architecture and/or the shader programming model for one or more of shader processing stages of a GPU rendering pipeline, such as, e.g., the hull shader processing stage, the domain shader processing stage, the geometry shader processing stage, the tessellation control shader processing stage, or the tessellation evaluation shader processing stage.

In additional examples, the techniques of this disclosure may include selecting, with a shader program executing on a shader unit of a GPU, a data processing technique from a plurality of data processing techniques based on a primitive type associated with the data to be processed by the shader program, and processing, with the shader program executing on a shader unit of the GPU, the data according to the selected data processing technique. For example, the shader program may select a first data processing technique for processing data associated with a first primitive type and a second data processing technique for processing data associated with a second primitive type. The shader program may be, for example, a hull shader program, a domain shader program, a geometry shader program, a tessellation control shader program, or a tessellation evaluation shader program.

In some examples, the hull shader program and/or the domain shader program (or, alternatively, the tessellation control shader program and the tessellation evaluation shader program) may determine whether the primitive is a three control point patch (e.g., a triangle) or a four control point patch (e.g., a quad). In response to determining that the primitive is a three control point patch, the hull shader program and/or the domain shader program may convert the primitive into a triangular Bézier patch surface, and generate a plurality of triangle primitives to approximate the curvature of the triangular Bézier patch surface. In response to determining that the primitive is a four control point patch, the hull shader program and/or the domain shader program may convert the primitive into a bi-cubic Bézier patch surface, and generate a plurality of triangle primitives to approximate the curvature of the bi-cubic Bézier patch surface.

The plurality of triangles that approximate the triangular Bézier patch surface may be optionally further processed by a geometry shader program, and may be rasterized by a rasterizer to generate a rasterized version of the triangular Bézier patch surface (i.e., a rasterized, 2D image that depicts the triangular Bézier patch surface). Similarly, the plurality of triangles that approximate the bi-cubic Bézier patch surfaces may be optionally further processed by a geometry shader program, and may be rasterized by a rasterizer to generate a rasterized version of the bi-cubic Bézier patch surface (a rasterized, 2D image that depicts the bi-cubic Bézier patch surface).

In some examples, during the execution of a draw call command, the hull shader stage may configure the number of times that the hull shader program is to be invoked for processing a primitive based on the primitive type of the primitive to be processed. For example, the hull shader stage may invoke a hull shader program three times for processing a three control point patch during the execution of a draw call command, and invoke the hull shader program four times for processing a four control point patch during the execution of a draw call command. In such examples, the patch constant function may be invoked, in some examples, once per primitive.

In further examples, a rasterizer may be configured to select a rasterization technique from a set of two or more rasterization techniques based on a rasterization primitive type received from a different processing stage in the graphics pipeline. For example, the rasterizer may select a first rasterization technique from the set of two or more rasterization techniques if the rasterization primitive type is a first rasterization primitive type, and select a second rasterization technique from the set of two or more rasterization techniques if the rasterization primitive type is a second rasterization primitive type. The first rasterization primitive type may be different than the second rasterization primitive type. The first rasterization technique may be different than the second rasterization technique. In some examples, the rasterization primitive type may be received by the rasterizer from a geometry shader processing stage of the graphics rendering pipeline. Allowing a rasterizer to rasterize rasterization primitives of different rasterization primitive types during a single draw call may enable the graphics pipeline to render input primitives that map to different rasterization primitive types during a single draw call.

In some examples, the set of rasterization primitive types may correspond to primitive types that are capable of being received and rasterized by a rasterizer in a graphics rendering pipeline. For example, the set of rasterization primitive types may correspond to primitive types for which a rasterizer in a graphics rendering pipeline has a distinct set of rasterization rules. In other words, in some examples, each of the rasterization primitive types may correspond to a respective one of a plurality of sets of rasterization rules that defines how the rasterizer is to rasterize the respective rasterization primitive type. In some examples, there may be a one-to-one correspondence between the sets of rasterization rules and the rasterization primitive types. In contrast, the input primitive types may correspond to primitive types that are capable of being received by a GPU from a host processor (e.g., a CPU) and capable of being rendered by a graphics rendering pipeline implemented by the GPU.

In some examples, the rasterization primitive type may be selected from a set of rasterization primitive types that includes a point stream, a line stream, and a triangle stream. In further examples, the rasterization primitive type may be selected from a set of rasterization primitive types that includes a point, a line, and a triangle. In some cases, the rasterization techniques may correspond to the different rasterization rules defined by a graphics API, such as, e.g., the DX 11 graphics API. For example, if the rasterization primitive type is a triangle stream, then the rasterizer may select a set of rasterization rules that corresponds to rasterizing triangles in a triangle stream.

In yet further examples, the techniques of this disclosure may provide an application programming interface (API) that allows a user application to specify a primitive type associated with individual vertices and/or groups of vertices to be rendered during the execution of a draw call. For example, the API may allow a user to specify different primitive types for different vertices to be rendered. In some examples, the API may also include instructions and/or data structures that allow a user application to place data indicative of the primitive type for each of the vertices to be processed during a draw call instruction into one or more buffers (e.g., vertex buffers) that are accessible by the GPU. In additional examples, the API may include a state command that instructs the GPU to execute a draw call command based on the data indicative of the primitive type for each of the vertices to be processed.

In more examples, the techniques of this disclosure may provide a host processor (e.g., a CPU) that is configured to place a plurality of vertices to be processed by a GPU into one or more buffers, to place data indicative of a primitive type for each of the plurality of vertices to be processed by the GPU into the one or more buffers, and to issue a draw call command to the GPU where the draw call command instructs the GPU to process the vertices in the one or more buffers based on the data indicative of the primitive type for each of the plurality of vertices.

According to some aspects of this disclosure, techniques are described for rendering a plurality of primitives using tessellation domains of different domain types during the execution of a draw call command. For example, a 3D graphics pipeline may render a first subset of the plurality of primitives based on a first tessellation domain type during the execution of the draw call command, and render a second subset of the plurality of primitives based on a second tessellation domain type during the execution of the same draw call command. The first tessellation domain type may be different than the second tessellation domain type. In some cases, the primitive type of the first subset of the plurality of primitives may be different than the primitive type of the second subset of the plurality of primitives. In additional cases, individual primitives in the first subset of the plurality of primitives and/or individual primitives in the second subset of the plurality of primitives may be of different primitive types.

A tessellator may be a fixed-function processing stage that is configured to generate positional coordinates based on a tessellation domain and one or more tessellation factors. The tessellation factors may specify the degree of tessellation that the tessellator is to apply to the domain (e.g., how finely the domain should be subdivided and/or the number of smaller objects into which the domain should be subdivided).

In some examples, the techniques of this disclosure may provide a 3D graphics pipeline that is configured to determine a primitive type associated with one or more vertices to be processed during the execution of a draw call command, and to select a tessellation domain type for processing the vertices based on the primitive type during the execution of the draw call command. For example, the 3D graphics pipeline may receive primitive type data from one or more buffers associated with a plurality of vertices to be processed during a draw call command, and provide that data to a processing stage of the graphics pipeline that specifies a tessellation domain to be used by the tessellator. The processing stage that specifies the tessellation domain may select a tessellation domain for processing a primitive based on the primitive type associated with the primitive. The tessellator stage may be invoked for each of a plurality of primitives processed by the graphics pipeline. The processing stage that specifies the tessellation domain may select a tessellation domain for each of the primitives based on the primitive type of the primitive to be processed, and provide the selected tessellation domain to the tessellator stage to be used during an invocation of the tessellator stage that corresponds to the primitive to be processed. The processing stage that specifies a tessellation domain to be used by the tessellator stage may be, for example, a hull shader processing stage.

In further examples, the techniques of this disclosure may provide a shader architecture and/or a shader programming model that allows different tessellation domain types to be selected and provided as a varying output (i.e., an output that may vary during the draw call) to other processing stages in the graphics pipeline based on a primitive type associated with the data to be processed. The shader architecture and/or the shader programming model may correspond to the shader architecture and/or the shader programming model for one or more of shader processing stages in a GPU rendering pipeline, such as, e.g., the hull shader processing stage, the domain shader processing stage, the geometry shader processing stage, the tessellation control shader processing stage, and the tessellation evaluation shader processing stage.

In additional examples, the techniques of this disclosure may include selecting, with a shader program executing on a shader unit of a GPU, a tessellation domain type based on a primitive type associated with the data to be processed by the shader program, and rendering, with the GPU, a primitive associated with the data to be processed based on the selected tessellation domain type. For example, the shader program may select a first tessellation domain type for data associated with a first primitive type and a second tessellation domain type for data associated with a second primitive type. The shader program may be, for example, a hull shader program, a domain shader program, a geometry shader program, a tessellation control shader program, or a tessellation evaluation shader program.

In some examples, the hull shader program may determine whether the primitive is a three control point patch (e.g., a triangle) or a four control point patch (e.g., a quad). In response to determining that the primitive is a three control point patch, the hull shader program, may select a triangle domain type (i.e., "tri") to be used for processing the primitive, and provide the selected triangle domain type to the tessellator processing stage. In response to determining that the primitive is a four control point patch, the hull shader program may select a quadrilateral domain type (i.e., "quad") to be used for processing the primitive, and provide the selected quadrilateral domain type to the tessellator processing stage.

In some examples, the hull shader program may provide the selected tessellation domain type to other processing stages of the graphics pipeline in addition to or in lieu of the tessellation stage, including, e.g., the domain shader stage and the geometry processing stage. The selection of the tessellation domain type may, in some examples, be performed as part of the patch constant function of the hull shader program. In addition to hull shader stage selecting the domain type based on the primitive type of the primitive to be processed, the hull shader stage may also select a processing technique and/or a number of times to invoke the hull shader program based on the primitive type of the primitive to be processed.

In further examples, the techniques of this disclosure may provide a shader architecture and/or a shader programming model that allows different data processing techniques to be selected based on a tessellation domain type associated with a primitive to be processed. The shader architecture and/or the shader programming model may correspond to the shader architecture and/or the programming model for one or more of shader processing stages in a GPU rendering pipeline, such as, e.g., the hull shader processing stage, the domain shader processing stage, the geometry shader processing stage, the tessellation control shader processing stage, and the tessellation evaluation shader processing stage.

In additional examples, the techniques of this disclosure may include selecting, with a shader program executing on a shader unit of a GPU, a data processing technique from a plurality of data processing techniques based on a tessellation domain type associated with the data to be processed by the shader program, and processing, with the shader program executing on a shader unit of the GPU, the data according to the selected data processing technique. For example, the shader program may select a first data processing technique for processing data associated with a first tessellation domain type and a second data processing technique for processing data associated with a second primitive type. The shader program may be, for example, a domain shader program, a geometry shader program, or a tessellation evaluation shader program.

As used herein, a vertex may generally refer to a vertex data structure or a control point data structure. A vertex data structure may correspond to a vertex included in the actual geometry of a primitive to be rendered, while a control point data structure need not correspond to a point in the actual geometry of the control patch to be rendered. Rather, a control point may be used to indirectly define the geometry of the control patch.

FIG. 1 is a block diagram illustrating an example computing device 2 that may be used to implement the multi-primitive type rendering techniques of this disclosure and/or multi-tessellation domain type rendering techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a system memory 10, a graphics processing unit (GPU) 12, a GPU cache 14, a display interface 16, a display 18 and bus 20. User interface 4, CPU 6, memory controller 8, GPU 12 and display interface 16 may communicate with each other using bus 20. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to memory system 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., draw call commands, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 18 more quickly than rendering the images using CPU 6. In addition, the highly parallel nature of GPU 12 may allow GPU 12 to process certain types of vector and matrix operations for general-purposed computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by reducing the need of GPU 12 to read and write data via bus 20, which may experience heavy bus traffic. In some instances, however, GPU 12 may not include a separate cache, but instead utilize system memory 10 via bus 20. GPU cache 14 may include one or more volatile or non-volatile memories or storage devices, such as, e.g., random access memory (RAM), static RAM (SRAM), dynamic RAM (DRAM), etc.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing.

Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computer device 2 via a wired or wireless communications link. For instance, display 18 may be a computer monitor or flat panel display connected to a personal computer via a cable or wireless link.

Bus 20 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 20 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

According to some aspects of this disclosure, GPU 12 may be configured to render a plurality of primitives that includes at least two different types of primitives during the execution of a draw call command. For example, the plurality of primitives may include a first subset of primitives having a first primitive type and a second subset of primitives having a second primitive type, and GPU 12 may be configured to render the first subset of the plurality of primitives during the execution of the draw call command, and to render the second subset of the plurality of primitives during the execution of the draw call command. The second primitive type may be different than the first primitive type. The second subset of the plurality of primitives may be different than the first subset of the plurality of primitives.

In some examples, the first and second primitive types may be indicative of how many control points are to be used to define a primitive according to the respective primitive type. For example, the first primitive type may indicate that three control points are to be used to define a primitive according to the first primitive type, and the second primitive type may indicate that four control points are to be used to define a primitive according to the second primitive type. In such an example, the first and second primitive types may correspond to a three control point patch list primitive type and a four control point patch list primitive type, respectively.

In further examples, the first and second primitive types may be indicative of a shape of a primitive of the respective primitive type. For example, the first primitive type may indicate that a primitive of the first primitive type has a line shape, and the second primitive type may indicate that a primitive of the second primitive type has a triangle shape. In such an example, the first primitive type may be, e.g., a line list primitive type and the second primitive type may be, e.g., a triangle list primitive type.

In additional examples, the first and second primitive types may be indicative of a shape of one or more primitives that are generated based on the respective primitive type. For example, the first primitive type may indicate that primitives generate based on the first primitive type have a line shape, and the second primitive type may indicate that primitives generate based on the second primitive type have a triangle shape. In such an example, the first primitive type may be, e.g., a line list primitive type and the second primitive type may be, e.g., a triangle list primitive type.

In more examples, the first and second primitive types may be indicative of how vertices are to be connected to form a plurality of primitives of a particular shape. For example, the first primitive type may indicate that a triangle primitive is to be formed out of every three vertices in a vertex stream. In this example, the second primitive type may indicate that a triangle primitive is to be formed out of the first three vertices in a vertex stream, and that a triangle primitive is to be formed for each of the subsequent vertices in the vertex stream out of the respective subsequent vertex and the two vertices that are prior to the respective subsequent vertex. In this example, the first primitive type may be a triangle list primitive type and the second primitive type may be a triangle strip primitive type.

In further examples, the primitive type for each of the primitives to be rendered may be indicative of any combination of one or more of the following: (1) whether the primitive is a patch primitive; (2) if the primitive is a patch primitive, how many control points are to be used to define the primitive of the respective primitive type; (3) if the primitive is not a patch primitive, the shape of the primitives that are generated based on the respective primitive type; and (4) if the primitive is not a patch primitive, how vertices are to be connected to form one or more primitives of the particular shape associated with the respective primitive type. Other combinations are also possible.

In some examples, the primitive types may be selected from a set of primitive types that corresponds to all or a subset of the input primitive types that are capable of being received from a host device (e.g., CPU 6) and rendered by a graphics rendering pipeline implemented by GPU 12. For example, the primitive types may be selected from a set of primitive types that corresponds to the input primitive topologies available for a graphics rendering API, such as, e.g., the DX 11 API.

In further examples, the primitive types may be selected from a set of rasterization primitive types that corresponds to all or a subset of the rasterization primitive types that are capable of being received and rasterized by a rasterizer. For example, the primitive types may be selected from a set of rasterization primitive types that corresponds to the rasterization primitive types available for rasterization by a rasterizer in a graphics rendering API, such as, e.g., the DX 11 API.

According to additional aspects of this disclosure, GPU 12 may be configured to render a plurality or primitives using at least two different tessellation domain types during execution of the draw call command. For example, GPU 12 may be configured to render a first subset of the second plurality of primitives based on a first tessellation domain type during the execution of the draw call command, and to render a second subset of the second plurality of primitives based on a second tessellation domain type during the execution of the draw call command. In some examples, the plurality of primitives may include at least two different types of primitives. The second tessellation domain type may be different than the first tessellation domain type. The second subset of the plurality of primitives may be different than the first subset of the plurality of primitives. In some examples, the at least two different tessellation domain types may include a triangle tessellation domain type and a quadrilateral tessellation domain type.

A tessellation domain may refer to an object that is subdivided by a tessellator of a graphics pipeline to generate a plurality of coordinates for use by one or more subsequent processing stages of the graphics pipeline. In some examples, a tessellation domain type may define a shape of the object that is to be subdivided by the tessellator. In other words, the tessellation domain type that is used to render a respective one of a plurality of primitives may be indicative of the shape of the tessellation domain that is to be used for tessellating the respective one of the primitives when rendering the respective one of the plurality of primitives. For example, the first tessellation domain type may indicate that a triangle tessellation domain is to be used for tessellating primitives that are to be rendered using the first tessellation domain type, and the second tessellation domain type may indicate that a quadrilateral is to be used for tessellating primitives that are to be rendered using the second tessellation domain type.

In some examples, GPU 12 may include one or more shader units that are configured to execute a shader program that causes the one or more shader units to select a tessellation domain type for a primitive to be rendered based on a primitive type of the primitive to be rendered. For example, the shader program may cause the one or more shader units of GPU 12 to determine a primitive type for a primitive to be rendered, to select a first tessellation domain type for the primitive to be rendered in response to determining that the primitive type of the primitive to be rendered is a first primitive type, and to select a second tessellation domain type for the primitive to be rendered in response to determining that the primitive type of the primitive to be rendered is the second primitive type. In such examples, GPU 12 may be configured to render the primitive based on the selected tessellation domain type. In some cases, the shader program executed by the one or more shader units may be a hull shader program. In additional cases, the shader program executed by the one or more shader units may be a tessellation evaluation shader program.

In examples where GPU 12 includes one or more shader units that execute a shader program to select a tessellation domain type, the shader program may be further configured to cause the one or more shader units of GPU 12 to provide the selected tessellation domain type to one or more processing stages in a graphics pipeline of GPU 12 that are different than a processing stage that executes the shader program. In such examples, GPU 12 may be configured to render, using at least the one or more processing stages that are different than the processing stage that executes the shader program, the primitive based on the selected tessellation domain. In such examples, the one or more processing stages in the graphics pipeline of GPU 12 that are different than the processing stage that executes the shader program may include at least one of a domain shader stage, a tessellator stage, and a geometry shader stage.

In further examples where GPU 12 includes one or more shader units that execute a shader program to select a tessellation domain type, the one or more shader units of GPU 12 may be further configured to execute at least one of a domain shader program and a geometry shader program that causes the one or more shader units to select a data processing technique from a plurality of data processing techniques based on the selected tessellation domain type, and to process data associated with the primitive to be rendered based on the selected data processing technique.

In additional examples where GPU 12 includes one or more shader units that execute a shader program to select a tessellation domain type, the shader program may be further configured to cause the one or more shader units of GPU 12 to determine whether a primitive to be rendered is a three control point patch primitive or a four control point patch primitive, to select a triangle tessellation domain type in response to determining that the primitive to be rendered is a three control point patch primitive, and to select a quadrilateral tessellation domain type in response to determining that the primitive to be rendered is a four control point patch primitive. In such examples, GPU 12 may be further configured to render the primitive based on the selected tessellation domain type. For example, GPU 12 may render a triangular Bézier patch surface based on the triangle tessellation domain type in response to determining that the primitive to be rendered is a three control point patch primitive, and render a bi-cubic Bézier patch surface based on the quadrilateral tessellation domain type in response to determining that the primitive to be rendered is a four control point patch primitive.

In some examples, GPU 12 may include one or more shader units that are configured to execute a shader program that causes the one or more shader units to select a data processing technique from a plurality of data processing techniques based on a primitive type of a primitive associated with data to be processed by the shader program. In such examples, the shader program may further cause the one or more shader units to process the data according to the selected data processing technique. In some cases, the shader program may include at least one of a hull shader program, a domain shader program, a geometry shader program, a tessellation control shader program, and a tessellation evaluation shader program.

In further examples, GPU 12 may include one or more shader units that are configured to execute a shader program that causes the one or more shader units to determine whether a primitive to be rendered is a three control point patch primitive or a four control point patch primitive, and cause GPU 12 to render one of a triangular Bézier patch surface and a bi-cubic Bézier patch surface based on whether the primitive to be rendered is a three control point patch primitive or a four control point patch primitive. In such examples, the shader program may cause GPU 12 to generate a plurality of triangle primitives that approximate the curvature of a triangular Bézier patch surface defined by control points of the primitive to be rendered in response to the one or more shader units determining that the primitive to be rendered is a three control point patch primitive; and to generate a plurality of triangle primitives that approximate the curvature of a bi-cubic Bézier patch surface defined by the control points of the primitive to be rendered in response to the one or more shader units determining that the primitive to be rendered is a four control point patch primitive.

In additional examples, GPU 12 may be configured to receive from a host device first data indicative of a primitive type for each of a plurality of vertices to be rendered, and to provide second data indicative of a primitive type to one or more processing stages in a graphics rendering pipeline of the GPU. In some cases, the second data indicative of the primitive type may be a system-generated value that is generated by an input assembler stage of the graphics rendering pipeline of the GPU.

In some examples, the techniques described in this disclosure may be implemented in any of the components in computing device 2 illustrated in FIG. 1 including, e.g., CPU 6, GPU 12, and system memory 10. For example, the techniques for rendering a plurality of primitives of different primitive types during the execution of a draw call command and/or the techniques for rendering a plurality of primitives using tessellation domains of different domain types during the execution of a draw call command may be implemented, for example, in GPU 12. The techniques described above with respect to the host processor and the API may be implemented, for example, in CPU 6. The data indicative of the primitive types to be rendered and the plurality of vertices to be rendered may be stored, e.g., in system memory 10.

Figure 2:
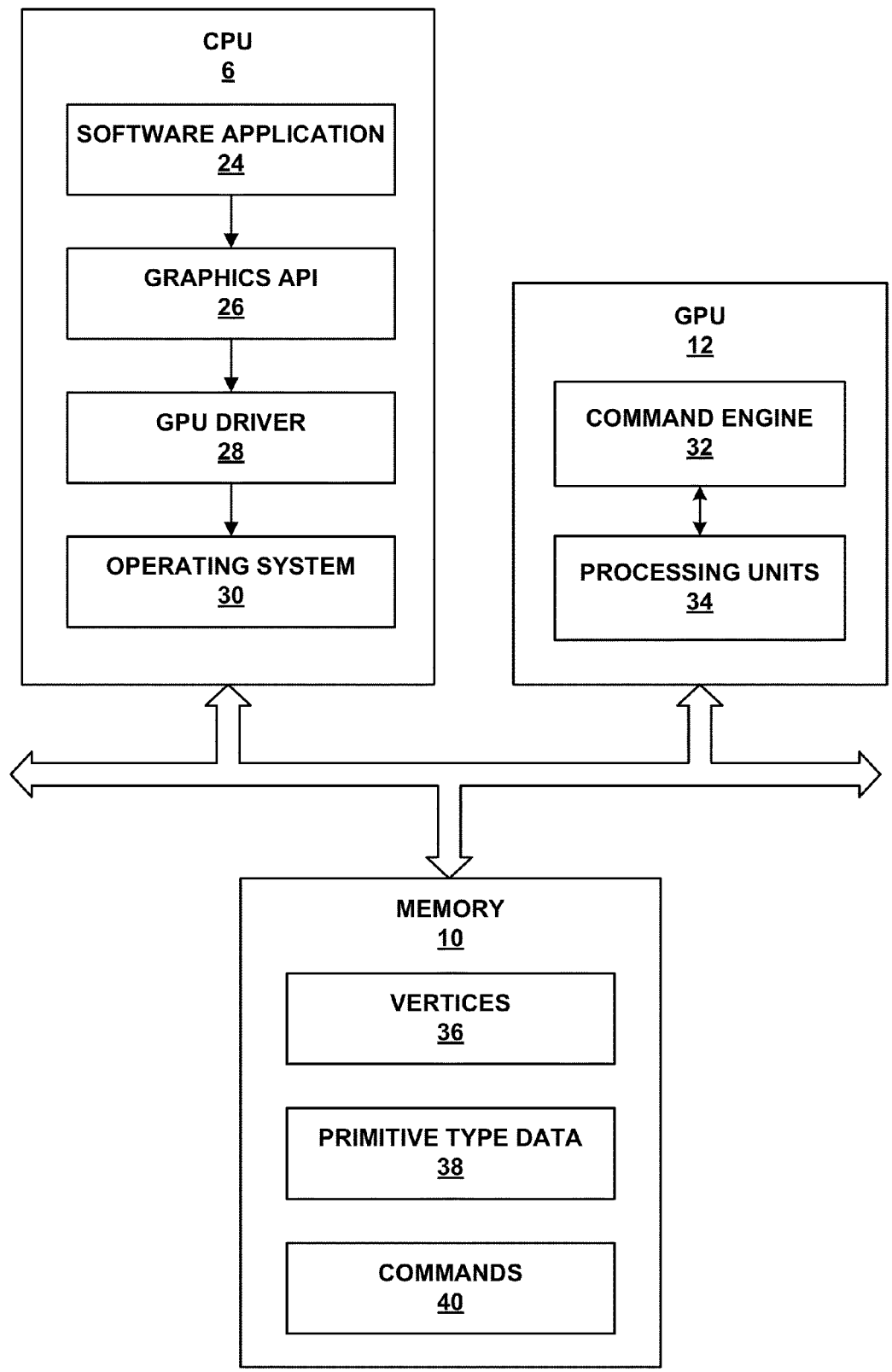
FIG. 2 is a block diagram illustrating the CPU, the GPU and the memory of the computing device in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC).

CPU 6 is configured to execute a software application 24, a graphics API 26, a GPU driver 28 and an operating system 30. GPU 12 includes a command engine 32 and one or more processing units 34. The one or more processing units 34 may form a 3D graphics rendering pipeline.

Memory 10 may store one or more vertices 36 to be rendered by GPU 12, primitive type data 38 associated with individual ones of and/or groups of vertices 36, and one or more commands 40. In some examples, vertices 36 may be stored in one or more vertex buffers allocated in memory 10. In such examples, primitive type data 38 may be stored in the same vertex buffers as vertices 36, in other vertex buffers, or in other data structures altogether. Commands 40 may be stored in one or more command buffers (e.g., a ring buffer).

Each of vertices 36 may include one or more attributes, such as, e.g., positional coordinates, normal coordinates, texture coordinates, etc. As discussed above, vertices 36 may correspond to the geometric vertices of a primitive and/or to the control points of a primitive. Primitive type data 38 may include data that is indicative of the primitive type for each of vertices 36. For example, vertices 36 may be grouped into groups of one or more vertices, and each of these groups of vertices may correspond to a primitive. The primitive type data may indicate the type of primitive associated with each of the groups of vertices and/or associated with the individual vertices within the groups of vertices. In some examples, the different primitive types may correspond to the set of primitive topologies that the graphics pipeline implemented by processing units 34 is capable of processing. In further examples, the different primitive types may correspond to the set of primitive topologies that are defined by graphics API 26 and are available for use by software application 24.

Commands 40 may include one or more state commands and/or one or more draw call commands. A state command may instruct GPU 12 to change one or more of the state variables in GPU 12, such as, e.g., the draw color. A draw call command may instruct GPU 12 to render the geometry defined by a group of one or more vertices 36 (e.g., defined in a vertex buffer) stored in memory 10. The geometry defined by the group of one or more vertices 36 may, in some examples, correspond to a plurality of primitives to be rendered. In general, the draw call command may invoke GPU 12 to render all of the vertices 36 stored in a defined section (e.g., buffer) of memory 10. In other words, once the GPU 12 receives the draw call command, control is passed to GPU 12 for rendering the geometry and primitives represented by the vertices in the defined section (e.g., buffer) of memory 10.

Software application 24 may each include one or more instructions that cause graphics images to be displayed and/or one or more instructions that cause a non-graphics task (e.g., a general-purposed computing task) to be performed on GPU 12. Software application 24 may issue instructions to graphics API 26. Graphics API 26 may be a runtime service that translates the instructions received from software application 24 into a format that is consumable by GPU driver 28.

GPU driver 28 receives the instructions from software application 24, via graphics API 26, and controls the operation of GPU 12 to service the instructions. For example, GPU driver 28 may formulate one or more commands 40, place the commands 40 into memory 10, and instruct GPU 12 to execute the commands 40. In some examples, GPU driver 28 may place the commands 40 into memory 10 and communicate with GPU 12 via operating system 30, e.g., via one or more system calls.

Command engine 32 is configured to retrieve and execute commands 40 stored in memory 10. In response to receiving a state command, command engine 32 may be configured to set one or more state registers in GPU to particular values based on the state command, and/or to configure one or more of the fixed-function processing units 34 based on the state command. In response to receiving a draw call command, command engine 32 may be configured to cause processing units 34 to render the geometry represented by vertices 36 in memory 10 based on primitive type data 38 stored in memory 10. Command engine 32 may also receive shader program binding commands, and load particular shader programs into one or more of the programmable processing units 34 based on the shader program binding commands.

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed-function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, alpha blending, etc.

The techniques described in this disclosure may be implemented in any of the components shown in FIG. 2 including, e.g., graphics API 26, GPU driver 28, command engine 32 and processing units 34. For example, the techniques for rendering a plurality of primitives of different primitive types during the execution of a draw call command and/or the techniques for rendering a plurality of primitives using tessellation domains of different domain types during the execution of a draw call command may be implemented in command engine 32 and/or in a graphics pipeline implemented by processing units 34. The techniques described above with respect to the host processor may be implemented, for example, in software application 24, graphics API 26 and/or graphics driver 28.

Figure 3:
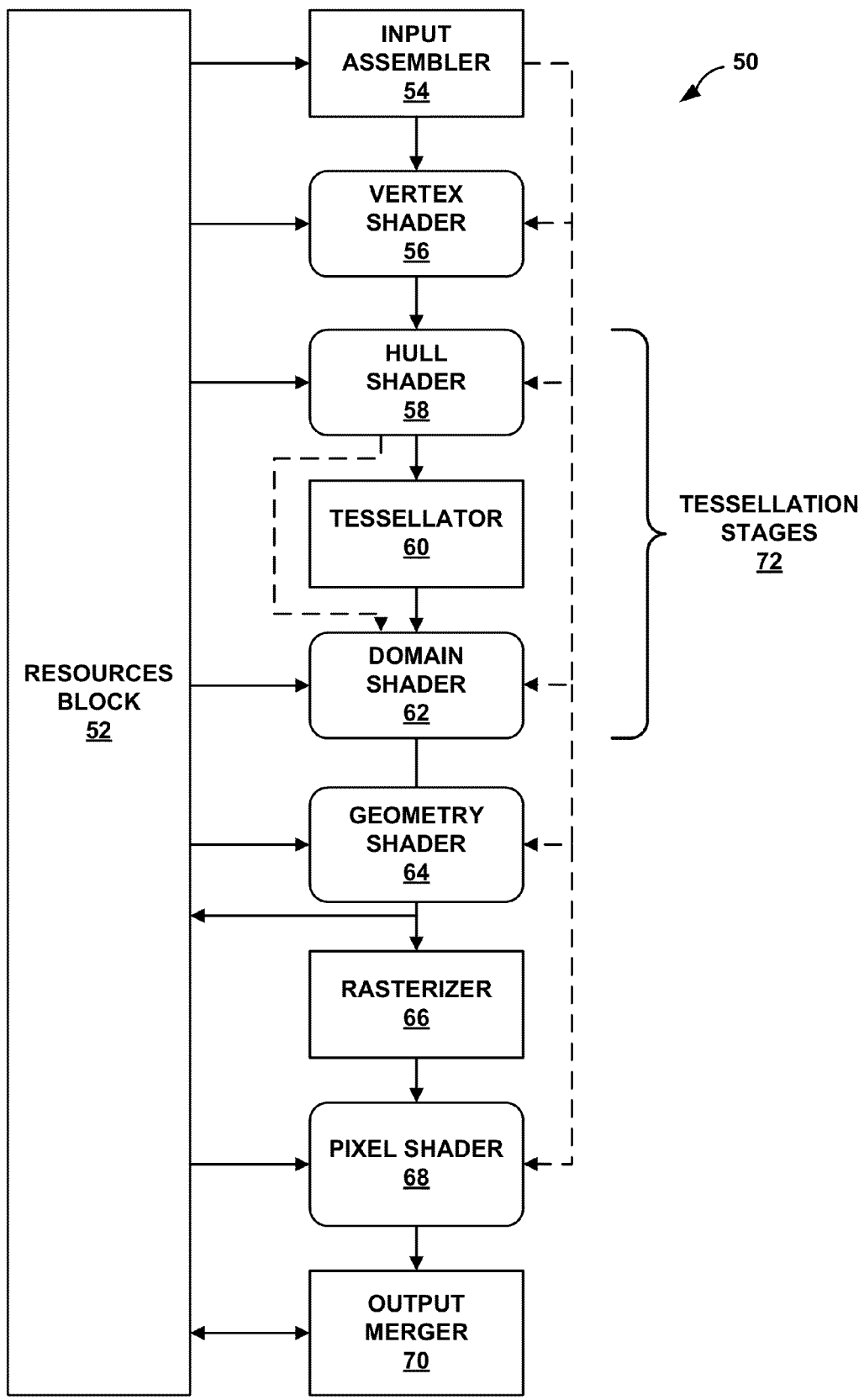
FIG. 3 is a conceptual diagram illustrating an example graphics pipeline that may perform the multi-primitive type rendering techniques of this disclosure and/or the multi-tessellation domain type rendering techniques of this disclosure.

FIG. 3 is a conceptual diagram illustrating an example graphics pipeline 50 that may perform the multi-primitive type rendering techniques of this disclosure and/or the multi-tessellation domain type rendering techniques of this disclosure.

As shown in FIG. 3, graphics pipeline 50 includes a resources block 52 and a plurality of processing stages. The plurality of processing stages include an input assembler (IA) 64, a vertex shader (VS) 66, a hull shader (HS) 68, a tessellator 60, a domain shader (DS) 72, a geometry shader (GS) 64, a rasterizer 66, a pixel shader (PS) 68, and an output merger 70. Hull shader 58, tessellator 60, and domain shader 62 may form the tessellation stages 72 of graphics pipeline 50.

Resources block 52 may correspond to one or more memory resources used by graphics pipeline 50, such as, e.g., one or more textures and/or one or more buffers. Resources block 52 may store input data to be processed by one or more of the processing stages in graphics pipeline 50 and/or output data from one or more of the processing stages in graphics pipeline 50. As one example, resources block 52 may store one or more vertex buffers. The one or more vertex buffers may store a plurality of vertices and/or a plurality of control points. As another example, resources block 52 may store a frame buffer that holds a rasterized version of the primitives rendered according to the techniques of this disclosure. In some examples, the memory resources that form resources block 52 may reside in memory 10 and/or GPU cache 14 of computing device 2.

The processing stages depicted in FIG. 3 with straight corners represent fixed-function processing stages, and the processing stages depicted in FIG. 3 with rounded corners represent programmable processing stages. For example, as shown in FIG. 3, input assembler 54, tessellator 60, rasterizer 66 and output merger 70 are fixed-function processing stages, and vertex shader 56, hull shader 58, domain shader 62, geometry shader 64 and pixel shader 68 are programmable processing stages. Each of the programmable stages may be configured to execute a shader program of a particular type. For example, vertex shader 56 may be configured to execute a vertex shader program, hull shader 58 may be configured to execute a hull shader program, etc. Each of the different types of shader programs may execute on a common shader unit of the GPU and/or on one or more dedicated shader units that are dedicated to executing shader programs of one or more particular types.

As shown in FIG. 3, input assembler 54, vertex shader 56, hull shader 58, domain shader 62, geometry shader 64, pixel shader 68 and output merger 70 are communicatively coupled to resources block 52. Input assembler 54, vertex shader 56, hull shader 58, domain shader 62, geometry shader 64, pixel shader 68 and output merger 70 are configured to retrieve and/or to receive input data from resources block 52. Geometry shader 64 and output merger 70 are configured to write output data to resources block 52. The above-described configuration of communication between the processing stages in graphics pipeline 50 and resources block 52 is merely one example of how the communication may be configured between the processing stages of graphics pipeline 50 and resources block 52. In other examples, more or less uni-directional and/or bi-directional communication channels may be provided between the processing stages of graphics pipeline 50 and resources block 52.

In some examples, the functionality of the different components and processing stages in graphics pipeline 50 may include some or all of the functionality described for similarly named components and processing stages in the Microsoft® DirectX (DX) 11 graphics pipeline. Additional background information regarding the general operation of the DirectX 11 graphics pipeline may be found in Zink et al., "Practical Rendering & Computation with Direct3D 11," CRC Press (2011), the entire content of which is incorporated herein by reference. In addition to incorporating some or all of the functionality of the similarly named components and processing stages DX 11 pipeline in such examples, one or more of the components and processing stages in graphics pipeline 50 may also be configured to perform the multi-primitive type rendering techniques of this disclosure and/or the multi-tessellation domain-type rendering techniques of this disclosure.

Input assembler 54 is configured to retrieve a plurality vertices from one or more vertex buffers, and to output the vertices to vertex shader 56 for further processing. The one or more vertex buffers may be stored in a memory (e.g., memory 10 shown in FIGS. 1 and 2 and/or resources block 52 shown in FIG. 3). The vertices and/or control points may correspond to one or more primitives to be rendered. Each of vertices may include one or more attributes, such as, e.g., positional coordinates, normal coordinates, texture coordinates, etc. As discussed above, vertices may correspond to the geometric vertices of a primitive and/or to the control points of a primitive.

In some examples, graphics pipeline 50 may be configured to perform indexed-based vertex retrieval. In such examples, input assembler 54 may retrieve vertex indexing data for a plurality of primitives to be rendered from a memory (e.g., memory 10 shown in FIGS. 1 and 2 and/or resources block 52 shown in FIG. 3). The vertex indexing data may be indicative of the order in which vertices from a vertex buffer are to be retrieved from the vertex buffer. The vertex indexing data may define a vertex order for each of the primitives to be rendered.

In examples where graphics pipeline 50 is configured to perform indexed-based vertex retrieval, input assembler 54 may retrieve vertices and/or control points that correspond to the plurality of primitives to be rendered from a vertex buffer based on the vertex indexing data. For example, input assembler 54 may retrieve a first vertex index corresponding to a first vertex to be retrieved from a vertex buffer, and may retrieve the first vertex from a first location (e.g., a first vertex slot) in the vertex buffer that is identified by the first vertex index. After retrieving the first vertex in this example, input assembler 54 may retrieve a second vertex index corresponding to a second vertex to be retrieved from a vertex buffer, and may retrieve the second vertex from a second location (e.g., a second vertex slot) in the vertex buffer that is identified by the second vertex index. Using indexed rendering may allow out-of-order access to vertices in a vertex buffer (i.e., vertices to be retrieved in a different order than the order in which such vertices were indexed). Using indexed-based vertex retrieval may allow the vertices in a vertex buffer to be accessed in an out-of-order fashion, which may reduce the complexity of vertex buffer generation by a graphics application. In addition, using indexed-based vertex retrieval may allow the same vertex to be retrieved multiple times from a vertex buffer during a single draw call, which may reduce memory footprint requirements for a particular draw call.

In examples where indexed-based vertex retrieval is not used, input assembler 54 may retrieve vertices and/or control points from a vertex buffer in the order in which the vertices are indexed. For example, if the vertex buffer includes an ordered sequence of vertex slots, input assembler 54 may retrieve a first vertex from a first vertex slot in the ordered sequence of vertex slots followed by a second vertex from a second vertex slot in the ordered sequence of vertex slots, etc.

In response to retrieving a vertex from a vertex buffer, input assembler 54 may pass the vertex on to vertex shader 56 for further processing. In some examples, input assembler 54 may pass the vertices to be processed by vertex shader 56 directly to vertex shader 56. In additional examples, input assembler 54 may direct vertex shader 56 to retrieve particular vertices for processing from a vertex buffer in resources block 52.

In some examples, input assembler 54 may generate and output one or more system-generated values, and pass the system-generated values onto one or more subsequent processing stages for use by the one or more subsequent processing stages. System-generated values may include, for example, a vertex identification value and a primitive identification value, and an instance identification value. The vertex identification value may be different for different vertices processed by graphics pipeline 50. Similarly, the primitive identification value may different for different primitives processed by graphics pipeline 50.

According to this disclosure, input assembler 54 may receive from a host device (e.g., CPU 6) data indicative of a primitive type for each of a plurality of vertices to be rendered, and provide data indicative of the primitive type of each of the vertices to one or more subsequent processing stages of graphics pipeline 50. For example, input assembler 54 may be configured to retrieve primitive type data for a plurality of vertices to be rendered from a memory (e.g., memory 10 shown in FIGS. 1 and 2 and/or resources block 52 shown in FIG. 3). As one example, input assembler 54 may retrieve the primitive type data from a primitive type buffer stored in resources block 52. The primitive type data may be indicative of the primitive type for each of vertices retrieved by input assembler 54.

A primitive type may refer to a type of primitive that is capable of being received and processed by the graphics processing pipeline. For example, the vertices retrieved by input assembler 54 may be grouped into groups of one or more vertices, and each of these groups of vertices may correspond to a primitive. The primitive type data may indicate the type of primitive associated with each of the groups of vertices and/or associated with the individual vertices within the groups of vertices. For example, the primitive type may define how vertices and/or control points are to be grouped together and/or connected to form a primitive for rendering. As another example, the primitive type may specify how many control points are to be used to define a respective one of the primitives to be rendered. In some examples, the different primitive types may correspond to the set of primitive topologies that graphics pipeline 50 is capable of processing. In further examples, the primitive types may correspond to the Microsoft® DirectX 11 primitive topologies. In additional examples, the different primitive types may correspond to the set of primitive topologies that are defined by a graphics API that is configured to interact with graphics pipeline 50. Example primitive types may include points, lines, triangles, line lists, line strips, triangle lists, triangle strips, 2-control point patch lists, 3-control point patch lists, 4-control point patch lists, etc.

According to this disclosure, input assembler 54 may be configured to determine the primitive type associated with each of the vertices to be processed by graphics pipeline 50 (e.g., based on data indicative of a respective primitive type for each of the vertices), and provide data indicative of a primitive type of each of the vertices to one or more subsequent processing stages of graphics pipeline 50. For example, input assembler 54 may pass the data indicative of the primitive type of each of the vertices to hull shader 58, domain shader 62 and/or geometry shader 64. In some examples, input assembler 54 may pass the data indicative of the primitive type of each of the vertices to pixel shader 68. In some examples, the data indicative of the primitive type may be a system-generated value that is generated by input assembler 54.

Vertex shader 56 is configured to process vertices received from input assembler 54 and/or resources block 52 and to generate an output vertex for each input vertex processed by vertex shader 56. For example, for each input vertex, vertex shader 56 may execute an instance of a vertex shader program on a shader unit of GPU 12. The input vertices received by vertex shader 56 and the output vertices generated by vertex shader 56 may be alternatively referred to as input control points and output control points, respectively.

In some examples, vertex shader 56 may perform one or more per-vertex operations for each of the vertices received by vertex shader 56 to generate the output vertices. As one example, vertex shader 56 may perform one or more of a world transformation, a view transformation, a projection transformation, or any combination thereof on the positional attributes of the input vertices to generate one or more transformed positional attributes for the output vertices. In further examples, vertex shader 56 may generate output vertices that have attributes which are identical to the input vertices (e.g., a "pass-through" vertex shader). As another example, vertex shader 56 may add and/or delete attributes from the set of input attributes to generate a set of output attributes for an output vertex.

If tessellation stages 72 are enabled for graphics pipeline 50, then the output vertices generated by vertex shader 56 may be passed on to hull shader 58 (e.g., either directly or through resources block 52) for further processing. If tessellation stages 72 are not enabled for graphics pipeline 50 but geometry shader 64 is enabled, then the output vertices generated by vertex shader 56 may be passed on to geometry shader 64 (e.g., either directly or through resources block 52) for further processing. If tessellation stages 72 are not enabled for graphics pipeline 50 and geometry shader 64 is not enabled for graphics pipeline 50, then the output vertices generated by vertex shader 56 may be passed on to rasterizer 66 (e.g., either directly or through resources block 52) for further processing.

Tessellation stages 72 (i.e., hull shader 58, tessellator 60, and domain shader 62) may tessellate a higher-order surface (e.g., a patch, a Bézier surface, a subdivision surface, etc.) into a plurality of lower-order primitives (e.g., points, lines, triangles). In some examples, the higher-order surfaces may be curved surfaces, and the lower-order primitives may have non-curved surfaces and non-curved edges. Each of the higher-order surfaces may be defined based on one or more control points in a control point patch list and based on one or both of a hull shader program and a domain shader program that are used to tessellate the surface. The plurality of lower-order primitives generated for each tessellated higher-order surface may approximate the curvature of the higher-order surface. The control point patch list that is used to define the higher-order surface may correspond to an input primitive that has a particular primitive type (e.g., a three control point patch list, a four control point patch list, etc.)

In general, hull shader 58 may pass the control points received from vertex shader 56 to domain shader 62 for further processing, and provide configuration data to tessellator 60. Tessellator 60 may determine values at which one or more parametric equations that represent a particular type of higher-order surface should be evaluated. Domain shader 62 may evaluate the parametric equations at the values determined by tessellator 60, and output a vertex for each evaluation. The vertices that are output by domain shader 62 may be grouped together to define a plurality of low-order primitives that approximate the curvature of the higher-order surface.

More specifically, hull shader 58 may process the control points received from vertex shader 56 and/or resources block 52 and may generate an output control point for each instance of the hull shader program executed by hull shader 58. For example, for each output control point to be generated by hull shader 58, hull shader 58 may execute an instance of a hull shader program on a shader unit of GPU 12. In some examples, hull shader 58 may execute a "pass-through" hull shader program for each output control point. The "pass-through" hull shader program may cause hull shader 58 to, for each output control point, output a control point that corresponds to a respective one of the input control points. In this case, an output control point may correspond to an input control point if the output control point has the same attributes as the input control point.

In further examples, hull shader 58 may generate one or more output attributes for an output control point that are not identical to the input attributes of a respective one of the input control points. For example, hull shader 58 may perform substantive processing on one or more of the attributes of the input control points to generate one or more attributes for the output control points. As another example, hull shader 58 may add and/or delete attributes from a set of input attributes to generate the set of output attributes for an output control point.

Hull shader 58 may also execute an instance of a patch constant function for each primitive (e.g., higher-order surface). The patch constant function may determine and provide configuration parameters to tessellator 60 to be used by tessellator 60 when generating output values. For example, the patch constant function may cause hull shader 58 to provide tessellation factors to tessellator 60. The tessellation factors may specify a degree of tessellation that tessellator 60 is to apply to a particular tessellation domain (e.g., how finely the domain should be subdivided and/or the number of smaller objects into which the domain should be subdivided).

As another example, the patch constant function may cause hull shader 58 to provide a tessellation domain type to tessellator 60. A tessellation domain may refer to an object that is used by tessellator 60 to generate a plurality of coordinates for use by domain shader 62. Conceptually, the tessellation domain may correspond to an object that is subdivided by tessellator 60 into a plurality of smaller objects. A tessellation domain type may define one or more attributes of the object (e.g., the shape of the object) that is to be subdivided by the tessellator. The positional coordinates of the vertices of the smaller objects are then sent to domain shader 62 for further processing. In some examples, the tessellation domain type may be selected from a set of tessellation domain types that include a quadrilateral tessellation domain type (i.e., a "quad"), a triangle tessellation domain type (i.e., a "tri"), and a line tessellation domain type (i.e., an "isoline"). The smaller objects into which the domain is subdivided, in some examples, may correspond to triangles, line segments, or points.

According to this disclosure, hull shader 58 may be configured to selectively configure the tessellation domain type to be used by tessellator 60 for tessellation on a primitive-by-primitive basis. For example, hull shader 58 may be configured to execute a hull shader program (e.g., a patch constant program) that causes hull shader 48 to select a tessellation domain type for a primitive to be rendered based on a primitive type of the primitive to be rendered. For example, hull shader 58 may determine a primitive type for a primitive to be rendered, select a first tessellation domain type for the primitive to be rendered in response to determining that the primitive type of the primitive to be rendered is a first primitive type, and select a second tessellation domain type for the primitive to be rendered in response to determining that the primitive type of the primitive to be rendered is a second primitive type.

One example tessellation domain type selection scheme will now be described. According to this example, if the primitive type of the primitive to be rendered is a four control point patch list, then hull shader 58 may select the quadrilateral tessellation domain type as the tessellation domain type to be used for tessellating the primitive. In such examples, if the primitive type of the primitive to be rendered is a three control point patch list, a triangle list, or a triangle strip, then hull shader 58 may select the triangle tessellation domain as the tessellation domain type to be used for tessellating the primitive. In such examples, if the primitive type of the primitive to be rendered is a two control point patch list, a line list, or a line strip, then hull shader 58 may select the isoline domain as the tessellation domain type to be used for tessellating the primitive. The example tessellation domain type selection scheme described above is merely one example that is described for illustrative purposes. It should be understood that other examples are possible and within the scope of this disclosure.

In response to selecting the tessellation domain type for a primitive to be rendered, hull shader 58 may cause graphics pipeline 50 to render the primitive based on the selected tessellation domain type. For example, hull shader 58 may provide the selected tessellation domain type to one or more additional processing stages in graphics pipeline 50 that are different than hull shader 58. Graphics pipeline 50 may use the one or more additional processing stages to render the primitive based on the selected tessellation domain type. For example, each of the one or more additional processing stages may perform a processing technique that is dependent on the selected tessellation domain type. In some examples, the one or more additional processing stages may include tessellator 60 and/or domain shader 62.

In some examples, to determine the primitive type of a primitive to be rendered, hull shader 58 may receive data indicative of the primitive type of a primitive to be rendered from input assembler 54. For example, hull shader 58 may receive a system-generated value from input assembler 54 that is indicative of the primitive type of the primitive to be rendered.

In further examples, hull shader 58 may select a hull shader data processing technique from a plurality of hull shader data processing techniques for processing data associated with a primitive to be rendered based on the primitive type of the primitive to be rendered. In such examples, hull shader 58 may process data associated with the primitive to be rendered based on the selected data processing technique. For example, hull shader 58 may determine a primitive type for a primitive to be rendered, select a first hull shader data processing technique from a plurality of hull shader data processing techniques for the primitive to be rendered in response to determining that the primitive type of the primitive to be rendered is a first primitive type, and select a second hull shader data processing technique from a plurality of hull shader data processing techniques for the primitive to be rendered in response to determining that the primitive type of the primitive to be rendered is a second primitive type.

In additional examples, hull shader 58 may pass the data indicative of the primitive type of the primitive to be rendered to one or more additional processing stages in graphics pipeline 50. For example, hull shader 58 may pass the data indicative of the primitive type of the primitive to be rendered to geometry shader 64, which may in turn use the data to select a processing technique for processing the vertices that correspond to the primitive.

Tessellator 60 may generate a plurality of output values for each primitive (e.g., higher-order surface) processed by tessellation stages 72. The output values may determine the values at which one or more parametric equations that represent a particular type of higher-order surface should be evaluated by domain shader 62. In some examples, tessellator 60 may generate the plurality of output values based on one or more tessellation factors and/or based on a tessellation domain type provided to tessellator 60 by hull shader 58.

For example, if the selected tessellation domain type is a quadrilateral tessellation domain type, tessellator 60 may, in some examples, subdivide a quadrilateral tessellation domain into a plurality of triangles, and output normalized coordinates that correspond to each of the vertices of the triangles to domain shader 62 for further processing. As another example, if the selected tessellation domain type is a triangle tessellation domain type, tessellator 60 may, in some examples, subdivide a triangle tessellation domain into a plurality of triangles, and output normalized coordinates that correspond to each of the vertices of the triangles to domain shader 62 for further processing. As a further example, if the selected tessellation domain type is an isoline tessellation domain type, tessellator 60 may, in some examples, subdivide an isoline tessellation domain into a plurality of line segments, and output normalized coordinates that correspond to each of the vertices (i.e., endpoints) of the line segments to domain shader 62 for further processing. In each of these examples, the tessellation factors may determine the amount by which tessellator subdivides the corresponding tessellation domain.

Domain shader 62 may receive the normalized coordinates generated by tessellator 60 and the control points for a higher-order surface from hull shader 58, and generate output vertices that correspond to a plurality of tessellated triangles and/or a plurality of tessellated line segments. The plurality of tessellated triangles and/or line segments may approximate the curvature and/or shape of a higher-order surface. For example, for each output value received from tessellator 60, domain shader 62 may execute an instance of a domain shader program on a shader unit of GPU 12. The domain shader program may cause domain shader 62 to evaluate one or more parametric equations at a particular value that is determined based on the particular coordinates received from tessellator 60, and to generate coordinates for an output vertex based on the evaluations. One or more of the coefficients of the parametric equations used to generate the output vertex coordinates may be defined based on one or more of the control points received from hull shader 58.

In examples where tessellation stages 72 are configured to generate a plurality of tessellated triangles, each of the output vertices generated by tessellation stages 72 may correspond to a respective vertex of a respective one of the plurality of tessellated triangles, and three consecutive output vertices may correspond to the vertices of a single tessellated triangle. In examples where tessellation stages 72 are configured to generate a plurality of line segments, each of the output vertices generated by tessellation stages 72 may correspond to a respective endpoint of a respective one of the plurality of line segments, and two consecutive output vertices may correspond to the endpoints of a single tessellated line segment. Each of the vertices may include one or more positional attributes that are indicative of the position of the respective vertex.

According to this disclosure, domain shader 62 may be configured to select a domain shader data processing technique from a plurality of domain shader data processing techniques for processing data associated with a primitive to be rendered based on the tessellation domain type selected for the primitive to be rendered. In such examples, domain shader 62 may process data associated with the primitive to be rendered based on the selected data processing technique. For example, domain shader 62 may determine a selected tessellation domain type for a primitive to be rendered, select a first domain shader data processing technique from a plurality of hull shader data processing techniques for the primitive to be rendered in response to determining that the selected tessellation domain type for the primitive to be rendered is a first tessellation domain type, and select a second domain shader data processing technique from a plurality of domain shader data processing techniques for the primitive to be rendered in response to determining that the selected tessellation domain type for the primitive to be rendered is a second tessellation domain type. In some examples, to determine the selected tessellation domain type for a primitive to be rendered, domain shader 62 may receive data indicative of the selected tessellation domain type from hull shader 58.

One example scheme for selecting a domain shader processing technique for a primitive to be rendered based on a tessellation domain type for the primitive to be rendered is now described. If the selected tessellation domain type for the primitive to be rendered is a quadrilateral, then domain shader 62 may evaluate a first set of one or more parametric equations to generate a plurality of triangle primitives that approximate the curvature of a bi-cubic Bézier patch surface defined by control points of the primitive to be rendered. In such examples, if the primitive type of the primitive to be rendered is a three control point patch list, a triangle list, or a triangle strip, then hull shader 58 may evaluate a second set of one or more parametric equations to generate a plurality of triangle primitives that approximate the curvature of a triangular Bézier patch surface defined by control points of the primitive to be rendered. In such examples, if the primitive type of the primitive to be rendered is a two control point patch list, a line list, or a line strip, then hull shader 58 may generate a plurality of line segments that correspond to the primitives to be rendered. The example domain shader data processing technique selection scheme described above is merely one example that is described for illustrative purposes. It should be understood that other examples are possible and within the scope of this disclosure.

In further examples, domain shader 62 may select a domain shader data processing technique from a plurality of domain shader data processing techniques for processing data associated with a primitive to be rendered based on the primitive type of the primitive to be rendered. In such examples, domain shader 62 may process data associated with the primitive to be rendered based on the selected data processing technique. For example, domain shader 62 may determine a primitive type for a primitive to be rendered, select a first domain shader data processing technique from a plurality of domain shader data processing techniques for the primitive to be rendered in response to determining that the primitive type of the primitive to be rendered is a first primitive type, and select a second domain shader data processing technique from a plurality of domain shader data processing techniques for the primitive to be rendered in response to determining that the primitive type of the primitive to be rendered is a second primitive type.

In some examples, to determine a primitive type for a primitive to be rendered, domain shader 62 may receive data indicative of the primitive type of a primitive to be rendered from input assembler 54. For example, domain shader 62 may receive a system-generated value from input assembler 54 that is indicative of the primitive type of the primitive to be rendered. In further examples, domain shader 62 may receive data indicative of the primitive type of a primitive to be rendered from hull shader 58.

If geometry shader 64 is enabled for graphics pipeline 50, then the output vertices generated by domain shader 62 may be passed on to geometry shader 64 (e.g., either directly or through resources block 52) for further processing. If geometry shader 64 is not enabled for graphics pipeline 50, then the output vertices generated by domain shader 62 may be passed on to rasterizer 66 (e.g., either directly or through resources block 52) for further processing.

Geometry shader 64 may receive vertices that correspond to an input primitive from one or more prior processing stages in graphics pipeline 50, and may generate output vertices that correspond to an output primitive. The vertices for the output primitive may be passed on to rasterizer 66 for further processing. In examples where tessellation is enabled for graphics pipeline 50, the input primitives and vertices received by geometry shader 64 may correspond to tessellated primitives (e.g., triangles or line segments) that are generated by domain shader 62. In examples where tessellation is not enabled for graphics pipeline 50, the input vertices received by geometry shader 64 may correspond to vertices that are output by vertex shader 56.

Geometry shader 64 may be invoked once for each of the primitives produced by domain shader 62. For example, for each of the tessellated primitives, geometry shader 64 may execute an instance of a geometry shader program on a shader unit of GPU 12, and generate an output primitive based on the input primitive. In some examples, the primitives that are generated by geometry shader 64 may take the form of triangle streams and/or line streams. In some examples, the output primitive may be identical to the input primitive.

In additional examples, geometry shader 64 may perform one or more per-primitive operations for each of the primitives received by geometry shader 64 to generate zero or more output primitives based on the input primitive. For example, geometry shader 64 may modify one or more attributes of the input vertices of the input primitive to produce output vertices for the output primitive. As another example, geometry shader 64 may add and/or delete vertices with respect to the input to produce output vertices for the output primitive. As a further example, geometry shader 64 may generate multiple output primitives based on a single input primitive and/or drop particular input primitives from further rendering in graphics pipeline 50.

According to this disclosure, geometry shader 64 may select a geometry shader data processing technique from a plurality of geometry shader data processing techniques for processing data associated with a primitive to be rendered based on the primitive type of the primitive to be rendered. In such examples, geometry shader 64 may process data associated with the primitive to be rendered based on the selected data processing technique. For example, geometry shader 64 may determine a primitive type for a primitive to be rendered, select a first geometry shader data processing technique from a plurality of geometry shader data processing techniques for the primitive to be rendered in response to determining that the primitive type of the primitive to be rendered is a first primitive type, and select a second geometry shader data processing technique from a plurality of geometry shader data processing techniques for the primitive to be rendered in response to determining that the primitive type of the primitive to be rendered is a second primitive type.

In some examples, to determine the primitive type of a primitive to be rendered, geometry shader 64 may receive data indicative of the primitive type of a primitive to be rendered from input assembler 54. For example, geometry shader 64 may receive a system-generated value from input assembler 54 that is indicative of the primitive type of the primitive to be rendered. In further examples, geometry shader 64 may receive data indicative of the primitive type of a primitive to be rendered from hull shader 58.

According to this disclosure, geometry shader 64 may, for each of the primitives received by geometry shader 64, select a rasterization primitive type based on the primitive type of the respective primitive received by geometry shader 64, and generate one or more rasterization primitives of the selected rasterization primitive type based on the respective primitive received by geometry shader 64. For example, if the primitive received by geometry shader 64 has a first primitive type, then geometry shader 64 may select a first rasterization primitive type, and generate one or more rasterization primitives of a first rasterization primitive type based on the primitive received by geometry shader 64. As another example, if the primitive received by geometry shader 64 has a second primitive type, then geometry shader 64 may select a second rasterization primitive type, and generate one or more rasterization primitives of a second rasterization primitive type based on the primitive received by geometry shader 64. The first primitive type and the second primitive type may be different. The first rasterization primitive type and the second rasterization primitive type may be the same or different.

Geometry shader 64 may provide the rasterization primitive type for each of the rasterization primitives generated by geometry shader 64 to rasterizer 66 for further processing. For example, geometry shader 64 may, for each of the rasterization primitives generated by geometry shader 64, provide data indicative of the respective rasterization primitive to rasterizer 66 and data indicative of a rasterization primitive type of the respective rasterization primitive to rasterizer 66.

Rasterizer 66 may be configured to convert a plurality of primitives (e.g., points, lines, and triangles) into a plurality of pixels that correspond to the primitives. For example, rasterizer 66 may receive three vertices that correspond to a triangle primitive, and convert the three vertices into a plurality of pixels that correspond to the screen pixel locations that are covered by the triangle primitive. Screen pixel locations that are covered by the triangle primitive may include screen pixel locations that correspond to the vertices of the triangle, the edges of the triangle, and the interior of the triangle. The primitives may be received from one or more prior stages of graphics pipeline 50 (e.g., vertex shader 56, domain shader 62, geometry shader 64, and/or resources block 52).

According to this disclosure, rasterizer 66 may be configured to select a rasterization technique from a plurality of rasterization techniques based on a rasterization primitive type received from a different processing stage in graphics pipeline 50. For example, rasterizer 66 may select a first rasterization technique from the plurality of rasterization techniques if the rasterization primitive type is a first rasterization primitive type, and select a second rasterization technique from the plurality rasterization techniques if the rasterization primitive type is a second rasterization primitive type. The first rasterization primitive type may be different than the second rasterization primitive type. The first rasterization technique may be the same as or different than the second rasterization technique. Allowing rasterizer 66 to rasterize rasterization primitives of different rasterization primitive types during a single draw call may enable the graphics pipeline to render input primitives that map to different rasterization primitive types during a single draw call.

In some examples, rasterizer 66 may receive data indicative of the rasterization primitive type for each of a plurality of rasterization primitives to be rasterized from geometry shader 64. In examples where geometry shader 64 is disabled, rasterizer 66 may receive data indicative of the rasterization primitive type for each of a plurality of rasterization primitives to be rasterized from domain shader 62 and/or from input assembler 54.

In some examples, the rasterization primitive type may be selected from a set of rasterization primitive types that includes a point stream, a line stream, and a triangle stream. In further examples, the rasterization primitive type may be selected from a set of rasterization primitive types that includes a point, a line, and a triangle. In general, the set of rasterization primitive types may correspond to the types of primitives that are capable of being rasterized by a rasterizer in the graphics pipeline. In some cases, the rasterization primitive types and the corresponding rasterization techniques may correspond to the different rasterization primitive types and corresponding rasterization rules defined by a graphics API, such as, e.g., the DX 11 graphics API. For example, if the rasterization primitive type is a triangle stream, then the rasterization may select a set of rasterization rules that corresponds to rasterizing triangles in a triangle stream.

Pixel shader 68 may receive pixels from rasterizer 66, and generate shaded pixels based on the received pixels according to a pixel shader program. For example, for each pixel received from rasterizer 66, pixel shader 68 may execute an instance of a pixel shader program on a shader unit of GPU 12. In some examples, pixel shader 68 may execute a "pass-through" pixel shader program for each pixel. The "pass-through" pixel shader program may cause pixel shader 68 to, for each pixel, output a pixel that corresponds to a respective one of the input pixel. In this case, an output pixel may correspond to an input pixel if the output pixel has the same attributes as the input pixel.

In further examples, pixel shader 68 may generate one or more output attributes for an output pixel that are not identical to the input attributes of a respective one of the input pixels. For example, pixel shader 68 may perform substantive processing on one or more of the attributes of an input pixel to generate one or more attributes for an output pixel. As another example, pixel shader 68 may add and/or delete attributes from a set of input attributes to generate the set of output attributes for an output pixel.

Output merger 70 may place pixel data received from pixel shader 68 into a render target (e.g., a frame buffer). In some examples, output merger 70 may merge the pixel data received from pixel shader 68 with the pixel data already stored in a render target based on a raster operation.

Graphics pipeline 50 may allow multiple different primitive types to be rendered during the execution of a single draw call command and/or multiple different tessellation domain types to be used during the execution of a single draw call command. Therefore, when user applications decide to render graphics objects and/or scenes that include primitives of different primitive types and/or require the use of different tessellation domains, such user applications do not necessarily need to perform separate draw call commands in order render the different primitive types. Relieving applications from the requirement of issuing separate draw calls for different primitive types may reduce the complexity and processing overhead for user applications.

In some examples, graphics pipeline 50 may be configured to switch between the rendering of different primitive types without requiring the rendering state to be switched and without requiring new shader programs to be bound to the pipeline. This may reduce the number of times that the render state of the pipeline needs to be switched during the rendering of a graphics scene and/or the number of times that shader programs need to be reloaded into different processing stage of the graphics pipeline 50, thereby improving the rendering efficiency of the graphics processing system.

Figure 4:
FIG. 4 is an image illustrating an example mesh from the Blender's Elephant's Dream.

3D designers and/or modelers often generate meshes to model a 3D object to be rendered. In some cases, a single mesh may include primitives of different primitive types, which may result in multiple draw call commands needing to be executed in order to render the mesh that represents the 3D object. For example, a mesh may include small number of isolated triangles in an otherwise quadrilateral mesh. As one specific example, the original Proog and Emo meshes (from Blender's Elephant's Dream) include 32,118 (97.8%) quadrilaterals and 886 (2.7%) triangles. FIG. 4 is an image illustrating an example mesh from the Blender's Elephant's Dream. As shown in FIG. 4, the isolated triangles are located around the center of the eyes and above eyebrows (see dark circles) in an otherwise quadrilateral surface mesh.

One approach for rendering meshes that include both triangles and quadrilaterals is to replace each of the triangles in the mesh with three quadrilaterals by applying Catmull-Clark (CC) subdivision. This approach can solve the problem of needing to use separate draw calls for rendering the mesh, but may quadruple the number of patches everywhere else and may therefore increase the amount of computation by four-fold. For example, one step of CC subdivision may turn the Proog and Emo models into a purely quadrilateral mesh with 131K facets. This may affect both memory requirements and CPU-GPU transfer (e.g., memory bandwidth usage).

Another approach for rendering meshes that include both triangles and quadrilaterals is to convert each of the triangles into a triangular Bézier patch. There are several schemes capable of converting a triangle into a triangular patch. However, these schemes typically require a separate pass and hence an overhead (e.g., sorting primitives by type and no longer preserving primitive order) that is to be avoided in real-time rendering.

This disclosure describes techniques for rendering meshes that include both triangles and quadrilaterals. The techniques of this disclosure may include enhancing the programmability of the hull shader (HS) to handle different domains in the same draw call. In some examples, the techniques of this disclosure may provide one or more new API instructions, which may be utilized to implement the aforementioned approach of converting triangles into triangular Bézier patches. The techniques of this disclosure may, in some examples, convert triangles into triangular Bézier patches independently from quads being converted into bi-cubic Bézier patches as described in further detail below with respect to FIGS. 6 and 8. It should be noted that conversion of triangles into triangular Bézier patches and quads into bi-cubic Bézier patches is merely one example of using the techniques of this disclosure, and that other example uses are possible and within the scope of this disclosure.

Figure 5:
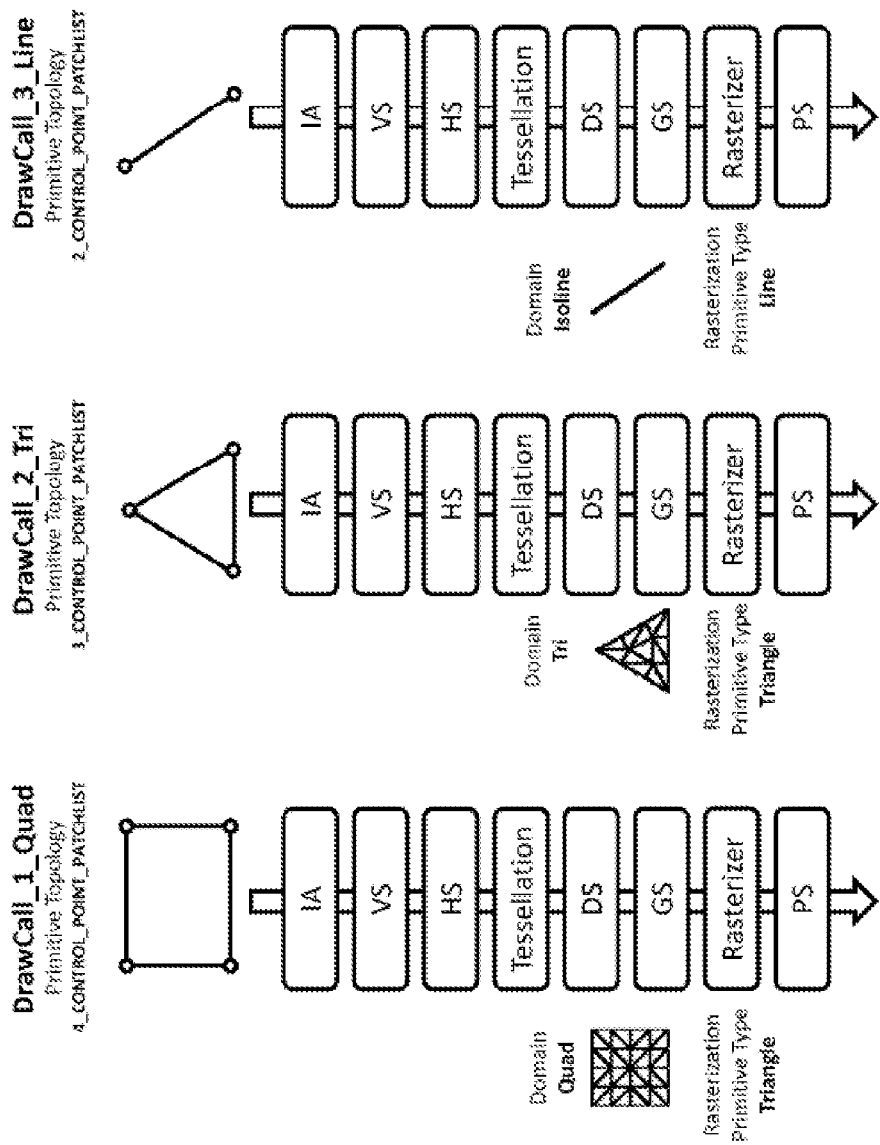
FIG. 5 is a conceptual diagram illustrating three example instantiations of a Microsoft® DirectX (DX) 11 graphics pipeline with tessellation enabled.

FIG. 5 is a conceptual diagram illustrating three example instantiations of the DX11 graphics pipeline with tessellation enabled. The DX11 graphics pipeline includes a plurality of processing stages where the output of one processing stage is provided as input into a subsequent processing stage. As shown in FIG. 5, the example instantiations of the DX11 pipeline include an input assembler (IA) processing stage, a vertex shader (VS) processing stage, a hull shader (HS) processing stage, a tessellation processing stage (alternatively "the tessellator processing stage"), a domain shader (DS) processing stage, a geometry shader (GS) processing stage, a rasterizer stage, and a pixel shader (PS) processing stage. Although not explicitly shown in FIG. 5, an output merger processing stage may be positioned subsequent to the PS processing stage.

Each of example instantiations of the DX11 pipeline shown in FIG. 5 is associated with a single type of draw call command (e.g., DrawCall__1_Quad, DrawCall__2_Tri, etc.). Each of the types of draw call commands is associated with a single tessellation domain type. For example, the first type of draw call command (i.e., DrawCall_1_Quad) is associated with a quadrilateral (i.e., "quad") tessellation domain type, the second type of draw call command (i.e., DrawCall_2_Tri) is associated with a triangle (i.e., "tri") tessellation domain type, and the third type of draw call command (i.e., DrawCall_3_Line) is associated with a line (i.e., "isoline") tessellation domain type.

Prior to invoking each of the instantiations of the DX11 pipeline shown in FIG. 5, a host processor (e.g., a CPU) may provide one or more state commands to the GPU to set the state of the GPU to render a specific type of primitive (i.e., the "Primitive Topology") shown in FIG. 5. For example, the left-hand instantiation of the DX11 pipeline indicates that the graphics pipeline is configured by the host processor to render primitives of a four control point patch list primitive type. Similarly, the middle instantiation of the DX11 pipeline indicates that the graphics pipeline is configured by the host processor to render primitives of a three control point patch list primitive type. Likewise, the right-hand instantiation of the DX11 pipeline indicates that the graphics pipeline is configured by the host processor to render primitives of a two control point patch list primitive type.

The primitive topologies shown in FIG. 5 may correspond to the "primitive type" discussed in other portions of this disclosure. The primitive topologies shown in FIG. 5 may be alternatively referred to as input primitive types in order to distinguish such primitive types from the rasterization primitive types.

Also prior to invoking each of the instantiations of the DX11 pipeline shown in FIG. 5, the host processor may provide a compiled HS program to the GPU to be bound to the pipeline instantiation. Binding the HS program to the pipeline instantiation may involve placing the HS program into the program memory (e.g., instruction cache) associated with the HS, and causing the HS program to execute when the pipeline is invoked in response to a draw call command. The HS program may specify the tessellation domain type to be used by the tessellation stage during the execution of a draw call command. For example, the left-hand instantiation of the DX11 pipeline indicates that the HS program specifies that a quad domain type is to be used by the tessellation stage, the middle instantiation of the DX11 pipeline indicates that the HS program specifies that a tri domain type is to be used by the tessellation stage, and the right-hand instantiation of the DX11 pipeline indicates that the HS program specifies that an isoline domain type is to be used by the tessellation stage.

The rasterization primitive types shown in FIG. 5 indicate the type of rasterization primitive that is output by domain shader. For example, in the example pipeline instantiation of FIG. 5, triangle rasterization primitives are generated for each of the input primitives when the quad domain type and the triangle domain type is specified by the HS program, and line rasterization primitives are generated for each of the input primitives when the isoline domain type is specified by the HS program.

As shown in FIG. 5, only primitives of a single primitive type can be rendered during a single draw call command in the existing DX 11 pipeline. If a mesh or another 3D graphics object includes primitives of different primitive types, then multiple draw call commands may need to be executed. Therefore, a host processor may need to separate out the different primitive types into different groups so that the different primitive types can be rendered during different draw calls. This may add significant complexity and delay to user applications that need to draw complex 3D objects and meshes with multiple different primitive types.

Moreover, between each of the draw calls, the rendering state of the pipeline may need to be changed to support different primitive types, and different shader programs may need to be bound to the graphics pipeline. The switching of the rendering state between each draw call command may consume a significant number of processing cycles, and therefore slow down the rendering of 3D scenes.

Figure 6:
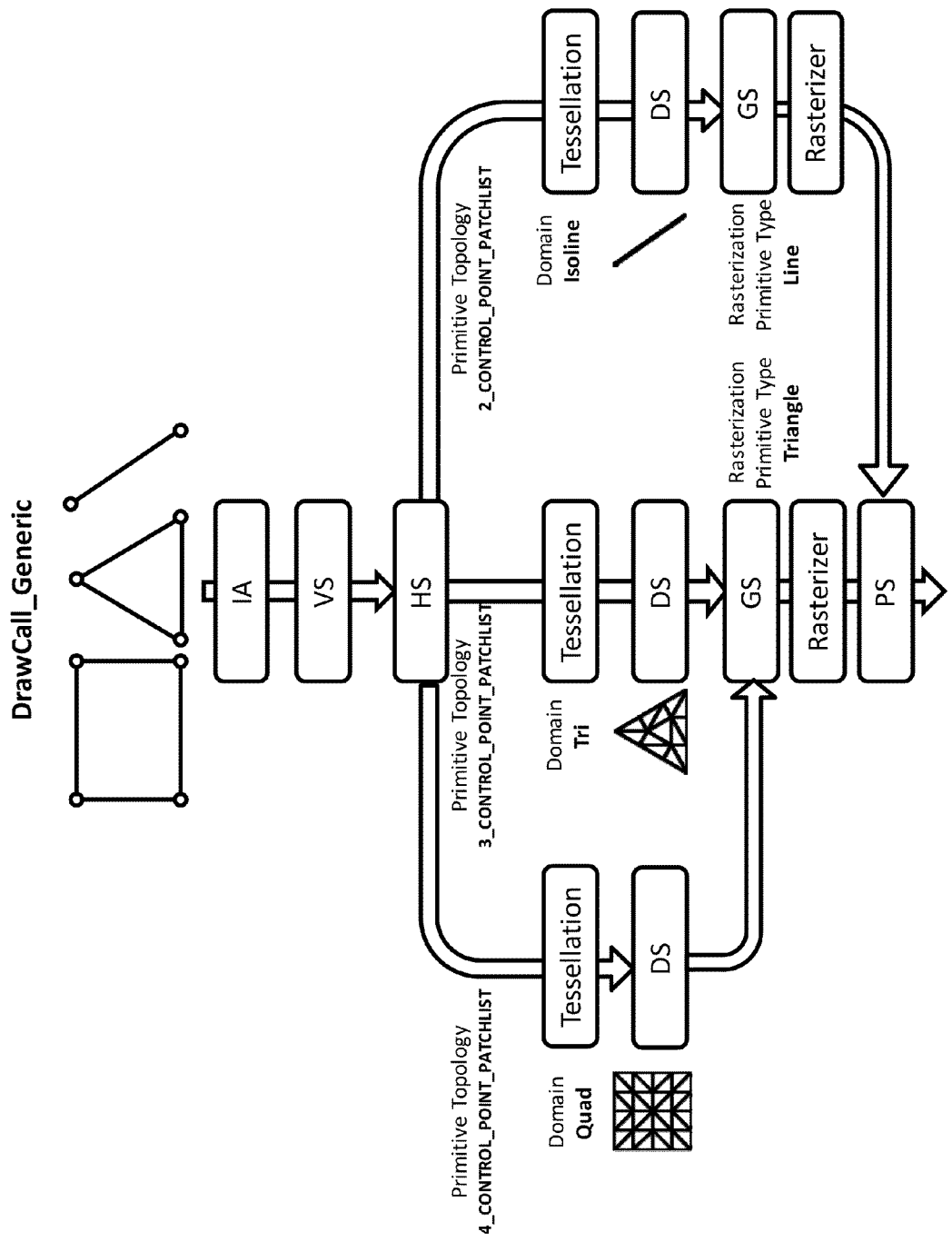
FIG. 6 is a conceptual diagram illustrating an example instantiation of a graphics pipeline according to this disclosure with tessellation enabled.

FIG. 6 is a conceptual diagram illustrating an example instantiation of a graphics pipeline according to this disclosure with tessellation enabled. The processing stages are arranged in a similar fashion to the pipeline instantiations discussed above with respect to FIG. 5. However, as shown in FIG. 6, primitives of multiple different primitive types may be able to be rendered as part of a single, generic type of draw call instruction (i.e., "DrawCall_Generic").

The IA stage may determine the primitive type associated with each vertex or control point to be processed, and pass data indicative of the primitive type of each of the vertices to one or more subsequent processing stages (e.g., as a system-generated value). For example, the IA stage may pass the data indicative of the primitive type of each of the vertices to the HS stage, the DS stage and/or the GS stage. In some examples, the IA stage may pass the data indicative of the primitive type of each of the vertices to the PS stage.

The HS stage may select a tessellation domain type for processing the primitive based on the data indicative of the primitive type. For example, as shown in FIG. 6, if the primitive type is a four control point patch list, then the HS stage may select the quad domain as the tessellation domain type. Similarly, if the primitive type is a three control point patch list, then the HS stage may select the tri domain as the tessellation domain type. Likewise, if the primitive type is a two control point patch list, then the HS stage may select the isoline domain as the tessellation domain type.

In some examples, the HS stage may select a hull shader processing technique from a plurality of hull shader processing techniques for processing an input primitive based on the primitive type of the input primitive. In further examples, the DS stage may select a domain shader processing technique from a plurality of domain shader processing techniques for processing an input primitive based on the primitive type of the input primitive. In additional examples, the GS stage may select a geometry shader processing technique from a plurality of geometry shader processing techniques for processing tessellated primitives for an input primitive based on the primitive type of the input primitive.

The rasterizer may be configured to receive data indicative of the rasterization primitive type from geometry shader, and rasterize the rasterization primitives received from the geometry shader based on the rasterization primitive type. For example, the rasterizer may select one or more rasterization rules to use when rasterizing primitives based on the rasterization primitive type.

By allowing multiple different primitive types to be rendered during a single draw call command and multiple different tessellation domain types to be used during a single draw call command, user applications do not necessarily need to perform separate draw call commands in order to render primitives of different types, which may reduce the complexity and processing overhead for user applications, particularly in cases where a 3D object or mesh may include primitives of differing types. Moreover, the techniques of this disclosure may reduce the number of times that the render state of the pipeline needs to be switched between draw call commands, thereby improving the rendering efficiency of the graphics processing system. In addition, the techniques of this disclosure may reduce the number of times that shader programs need to be reloaded into different processing stage of the pipeline, thereby providing further improvements in the rendering efficiency of the graphics processing system.

Figure 7:
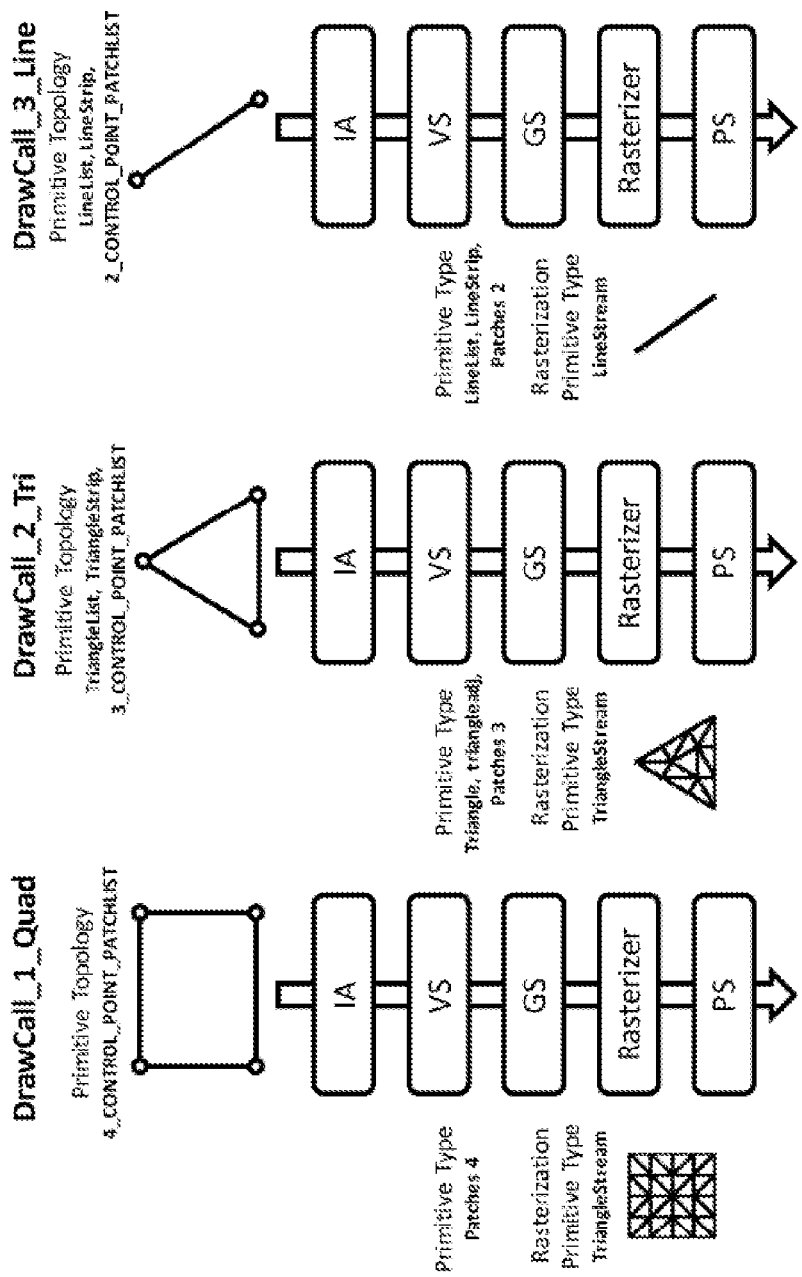
FIG. 7 is a conceptual diagram illustrating three example instantiations of a DX 11 graphics pipeline with the hardware tessellation stages disabled.

FIG. 7 is a conceptual diagram illustrating three example instantiations of a DX11 graphics pipeline with the hardware tessellation stages disabled. When tessellation is disabled, the HS, tessellation, and DS processing stages may be deactivated, and data my pass from the vertex shader stage to the geometry shader stage.

Prior to invoking each of the instantiations of the DX11 pipeline shown in FIG. 7, a host processor (e.g., a CPU) may provide one or more state commands to the GPU to set the state of the GPU to render a specific type of primitive (i.e., the "Primitive Topology") shown in FIG. 7. For example, the left-hand instantiation of the DX11 pipeline indicates that the graphics pipeline is configured by the host processor to render primitives of the four control point patch list primitive type. Similarly, the middle instantiation of the DX11 pipeline indicates that the graphics pipeline is configured by the host processor to render primitives of a triangle list primitive type, a triangle strip primitive type, or a three control point patch list primitive type. Likewise, the right-hand instantiation of the DX11 pipeline indicates that the graphics pipeline is configured by the host processor to render primitives of a line list primitive type, a line strip primitive type, or a two control point patch list primitive type.

It should be noted that, where multiple primitive types (i.e., multiple primitive topologies) are shown in a single example pipeline instantiation in FIG. 7, the pipeline instantiation may be configured to render only a single one of the primitive types for a given draw call command. In other words, where multiple primitive types are listed for a single illustrated pipeline instantiation, such a notation is effectively representing multiple different actual instantiations of the graphics pipeline—one instantiation for each primitive type. For example, the middle pipeline instantiation illustrated in FIG. 7 represents three different actual instantiations of the pipeline—a first instantiation for the "TriangleList" primitive type, a second instantiation for the "TriangleStrip" primitive type, and a third instantiation for the "3_CONTROL_POINT_PATCHLIST" primitive type. Only a single instantiation (and therefore a single primitive type) may be used for a given draw call instruction in the example of FIG. 7.

The primitive topologies shown in FIG. 7 may correspond to the "primitive type" discussed in other portions of this disclosure. The primitive topologies shown in FIG. 7 may be alternatively referred to as input primitive types in order to distinguish such primitive types from the rasterization primitive types.

Although the hardware tessellation stages are disabled in the graphics pipeline instantiations of FIG. 7, such graphics pipelines may, in some examples, still be able to perform tessellation using the geometry shader. In such examples, prior to invoking each of the instantiations of the DX11 pipeline shown in FIG. 7, the host processor may provide a compiled GS program to the GPU to be bound to the pipeline instantiation. Binding the GS program to the pipeline instantiation may involve placing the GS program into the program memory (e.g., instruction cache) associated with the GS, and causing the GS program to execute when the pipeline is invoked in response to a draw call command. The GS program may specify a tessellation technique to be used when tessellating input primitives during execution of the draw call command.

For example, the left-hand instantiation of the DX11 pipeline indicates that the GS program specifies a tessellation technique that tessellates a four control point patch list into a plurality of triangles that form a triangle stream. Similarly, the middle instantiation of the DX11 pipeline indicates that the GS program specifies a tessellation technique that tessellates one of a triangle list, a triangle strip, and a three control point patch list into a plurality of triangles that form a triangle stream. Likewise, the right-hand instantiation of the DX11 pipeline indicates that the GS program specifies a tessellation technique that tessellates one of a line list, a line strip, and a two control point patch list into a plurality of lines that form a line stream.

The rasterization primitive types shown in FIG. 7 indicate the type of rasterization primitive that is output by the geometry shader. For example, in the example pipeline instantiation of FIG. 7, a triangle stream rasterization primitive type is generated for each of the input primitives when the input primitive is a four control point patch list, a triangle list, a triangle strip, or a three control point patch list. The triangle stream rasterization primitive type may correspond to the triangle rasterization primitive type discussed above with respect to FIG. 5. Similarly, in the example pipeline instantiation of FIG. 7, a line stream rasterization primitive type is generated for each of the input primitives when the input primitive is a line list, a line strip, and a two control point patch list. The line stream rasterization primitive type may correspond to the line rasterization primitive type discussed above with respect to FIG. 5. It should be noted that the icons illustrated beneath the rasterization primitive type in FIG. 7 do not depict tessellation domain types, but rather depict a plurality of tessellated primitives that may be generated by geometry shader for a particular input primitive.

As shown in FIG. 7, only primitives of a single primitive type can be rendered during a single draw call command in the existing DX 11 pipeline. If a mesh or another 3D graphics object includes primitives of different primitive types, then multiple draw call commands may need to be executed. Therefore, a host processor may need to separate out the different primitive types into different groups so that the different primitive types can be rendered during different draw calls. This may add significant complexity and delay to user applications that need to draw complex 3D objects and meshes with multiple different primitive types.

Moreover, between each of the draw calls, the rendering state of the pipeline may need to be changed to support different primitive types, and different shader programs may need to be bound to the graphics pipeline. The switching of the rendering state between each draw call command may consume a significant number of processing cycles, and therefore slow down the rendering of 3D scenes.

Figure 8:
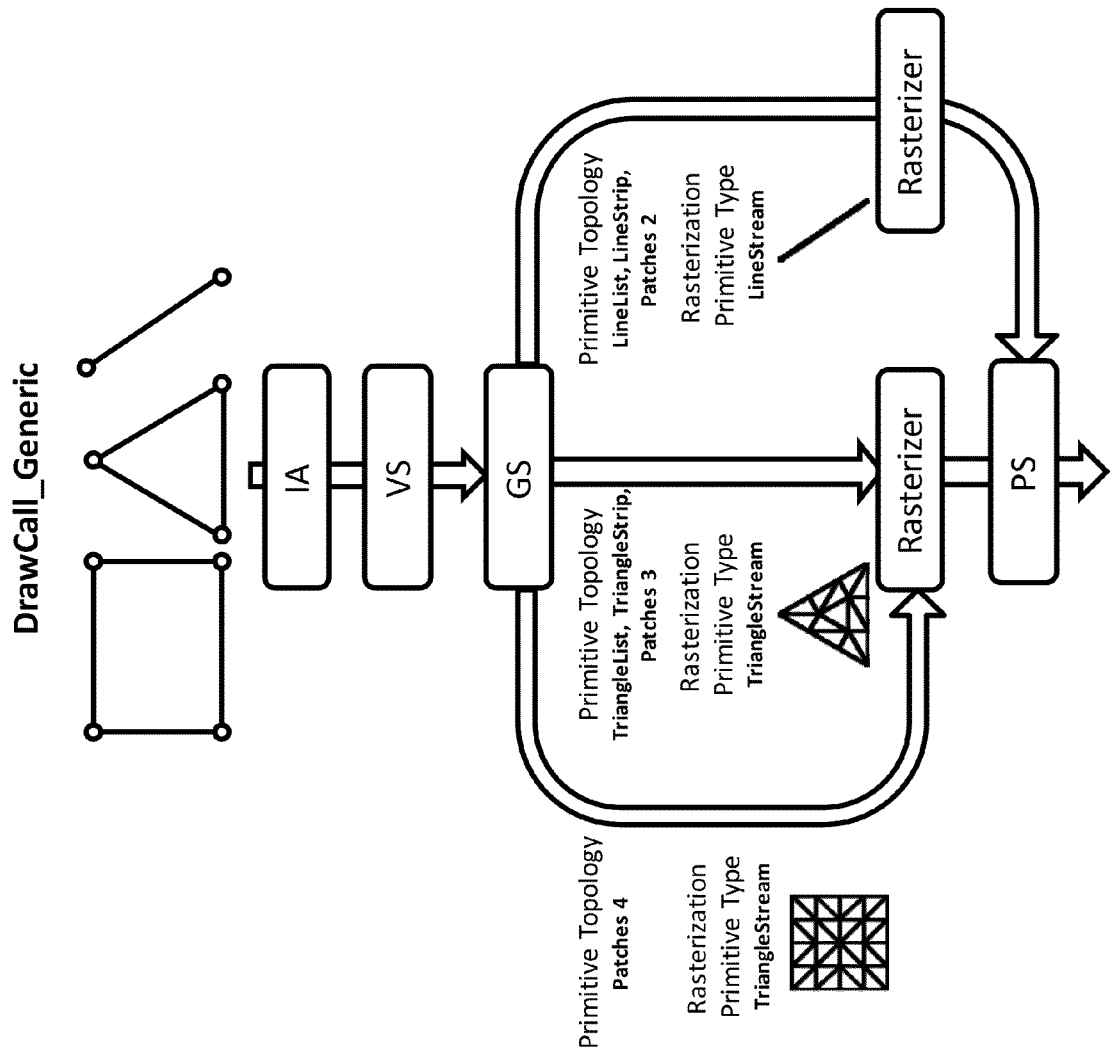
FIG. 8 is a conceptual diagram illustrating an example instantiation of a graphics pipeline according to this disclosure with the hardware tessellation stages disabled.

FIG. 8 is a conceptual diagram illustrating an example instantiation of a graphics pipeline according to this disclosure with the hardware tessellation stages disabled. As shown in FIG. 8, a generic type of draw call instruction may be used to render primitives of multiple different primitive types.

Similar to FIG. 6, the IA stage may determine the primitive type associated with each vertex or control point to be processed, and pass data indicative of the primitive type of each of the vertices to one or more subsequent processing stages (e.g., as a system-generated value). For example, the IA stage may pass the data indicative of the primitive type of each of the vertices to the GS stage. In some examples, the IA stage may pass the data indicative of the primitive type of each of the vertices to the PS stage. The GS stage may, in some examples, select a geometry shader processing technique from a plurality of geometry shader processing techniques based on the primitive type of the input primitive.

In some examples, the plurality of geometry shader processing techniques may include a plurality of tessellation techniques that are capable of generating a plurality of tessellated primitives based on an input primitive and that are capable of being implemented in the GS stage. In some examples, the GS stage may be invoked once per primitive, and during the single invocation for each primitive, the GS stage may generate a tessellation grid (e.g., parametric domain points) and iterate them.

The rasterizer may be configured to receive data indicative of the rasterization primitive type from geometry shader, and rasterize the rasterization primitives received from the geometry shader based on the rasterization primitive type. For example, the rasterizer may select one or more rasterization rules to use when rasterizing primitives based on the rasterization primitive type.

By allowing multiple different primitive types to be rendered during a single draw call command and multiple different tessellation domain types to be used during a single draw call command, user applications do not necessarily need to perform separate draw call commands in order to render primitives of different types, which may reduce the complexity and processing overhead for user applications, particularly in cases where a 3D object or mesh may include primitives of differing types. Moreover, the techniques of this disclosure may reduce the number of times that the render state of the pipeline needs to be switched between draw call commands, thereby improving the rendering efficiency of the graphics processing system. In addition, the techniques of this disclosure may reduce the number of times that shader programs need to be reloaded into different processing stage of the pipeline, thereby providing further improvements in the rendering efficiency of the graphics processing system.

Figure 9:
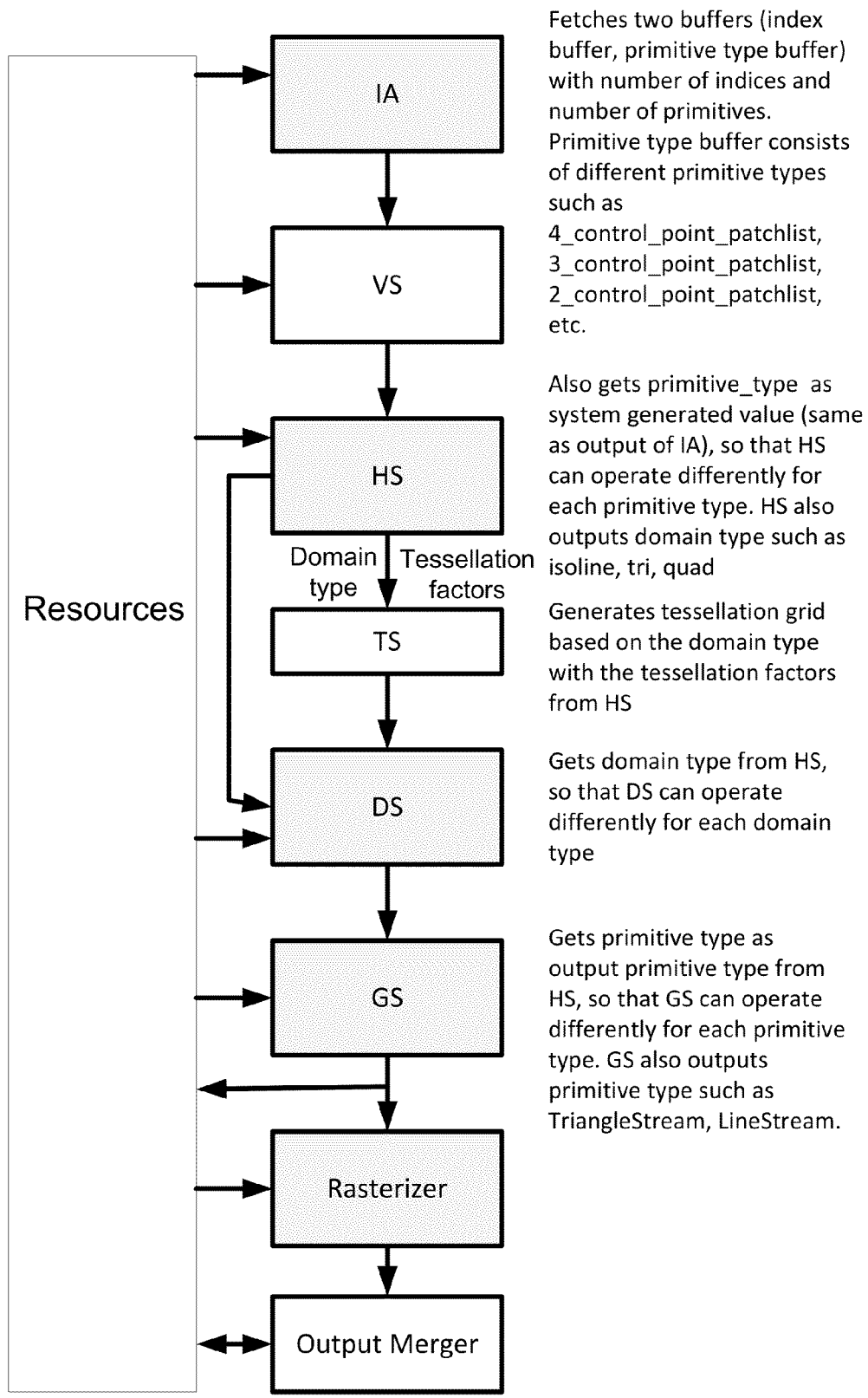
FIG. 9 is a block diagram illustrating an example graphics pipeline that may be used to implement the techniques of this disclosure.

FIG. 9 illustrates an example graphics pipeline that may be used to implement the techniques of this disclosure. As shown in FIG. 9, the IA may fetch two buffers (e.g., an index buffer and a primitive type buffer) with a number of indices and a number of primitives. The primitive type buffer may include data indicative of different primitive types such as, e.g., a 4_control_point_patchlist, a 3_control_point_patchlist, a 2_control_point_patchlist, etc. In some examples, the primitive type buffer may include different path types and/or primitive types such as patch_3, patch_4, etc. In some examples, a draw call may also access a primitive type buffer in addition to the index buffer. The IA stage may generate a primitive_type value based on the primitive type data received from the primitive type buffer, and provide the primitive_type value to one or more processing stages in the pipeline for use by the one or more processing stages of the pipeline.

The HS may receive the primitive_type value as a system-generated value (same as output of IA), and may operate differently for each primitive type. For example, the HS stage may select a tessellation domain type based on the primitive_type value and/or select a hull shader processing technique for a primitive to be processed by the HS based on the primitive_type value. The HS may output the selected domain types (such as, e.g., isoline, tri, quad) for the primitive being processed by the HS to the tessellator (TS) stage and/or the DS stage.

The TS stage may receive the domain type from the HS stage and tessellation factors from the HS, and generate a tessellation grid based on the domain type received from the HS stage and the tessellation factors received from the HS stage.

The DS stage may receive the domain type from the HS stage, and may operate differently for each domain type. For example, the DS stage may select a domain shader processing technique for a primitive to be processed from a set of domain shader processing techniques based on the domain type provided by the HS stage. In further examples, the DS stage may select a domain shader processing technique for a primitive to be processed from a set of domain shader processing techniques based on the primitive_type value.

The GS stage may receive the primitive_type value as output by the HS stage, and may operate differently for each primitive type. For example, the GS stage may select a geometry shader processing technique for a primitive to be processed by the GS stage based on the primitive_type value. GS also output a rasterization primitive type for the rasterizer, such as, e.g., a triangle stream (e.g., TriangleStream) or a line stream (e.g., LineStream).

As shown in FIG. 9, the HS stage may need to know the primitive type (triangle or quad), as well as output domain type. For example, the pipeline may provide a primitive type value (i.e., prim_type) as a system-generated value. In addition, a domain_type value may be generated along with tessellation factors, both of which may be sent to tessellation engine. The underlying output patch data may be a type which will be used by the DS stage.

To render a plurality of graphics primitives, a graphics driver (e.g., GPU driver 28) typically receives a draw call command from a higher-level graphics application (e.g., software application 24) that instructs the graphics driver to render the plurality of graphics primitives. The graphics driver typically passes on the draw call command to a GPU for further processing. In some cases, however, the graphics driver may split up the draw call command received from the higher-level graphics application into a plurality of draw call commands, and issue the plurality of draw call commands to one or more GPUs for further processing. Splitting up a draw call command may refer to subdividing the primitives to be rendered as part of the draw call received from the higher-level graphics application into a plurality of groups of primitives, and issuing a respective one of a plurality of draw call commands to one or more GPUs for each of the groups of primitives.

A graphics driver may split up a draw call command for various reasons. For example, a graphics driver may utilize a plurality of separate GPUs to provide hardware-accelerated graphics rendering services to higher-level applications. In such an example, a graphics system may be able to more efficiently process a draw call by subdividing the work among the plurality of separate GPUs and leveraging the parallelism gained by such a subdivision.

One technique for splitting up the primitive data associated with a draw call is to subdivide the primitive data received from the higher-level application into various subsets of data without analyzing the particular data that is to be subdivided. In other words, if 256 kilobytes (kB) of primitive data is received from a higher-level application, then the graphics driver may subdivide the data into two subsets of 128 kB. When performing this technique it is important that the subdivision boundary (or subdivision boundaries) coincide with the primitive boundaries within the primitive data. In other words, it is important the start of each of the subsets of primitive data be aligned with the starting data of a particular primitive. Otherwise, the subsets of the primitive data may include only partial data for some of the primitives, which may cause such primitives to not render properly.

In conventional GPUs, ensuring that the subdivision boundaries coincide with the primitive boundaries could be achieved by ensuring that the size of the data blocks after subdivision was divisible by the size of an individual primitive. Alternatively, coincidence of the subdivision and primitive boundaries could be achieved by ensuring that the number of vertices in the data blocks after subdivision was divisible by the number of vertices in an individual primitive.

The techniques in this disclosure, however, may allow different primitive types to be rendered during a single draw call. The different primitive types may have differing numbers of vertices, and hence different sizes of data footprints. The different sizes of data footprints may prevent the primitive data from being subdivided without further analysis of the data in order to determine where the primitive boundaries occur within the primitive data. Further analyzing the data to determine where the primitive boundaries occur may be expensive in terms of processing time and resources.

Figure 10:
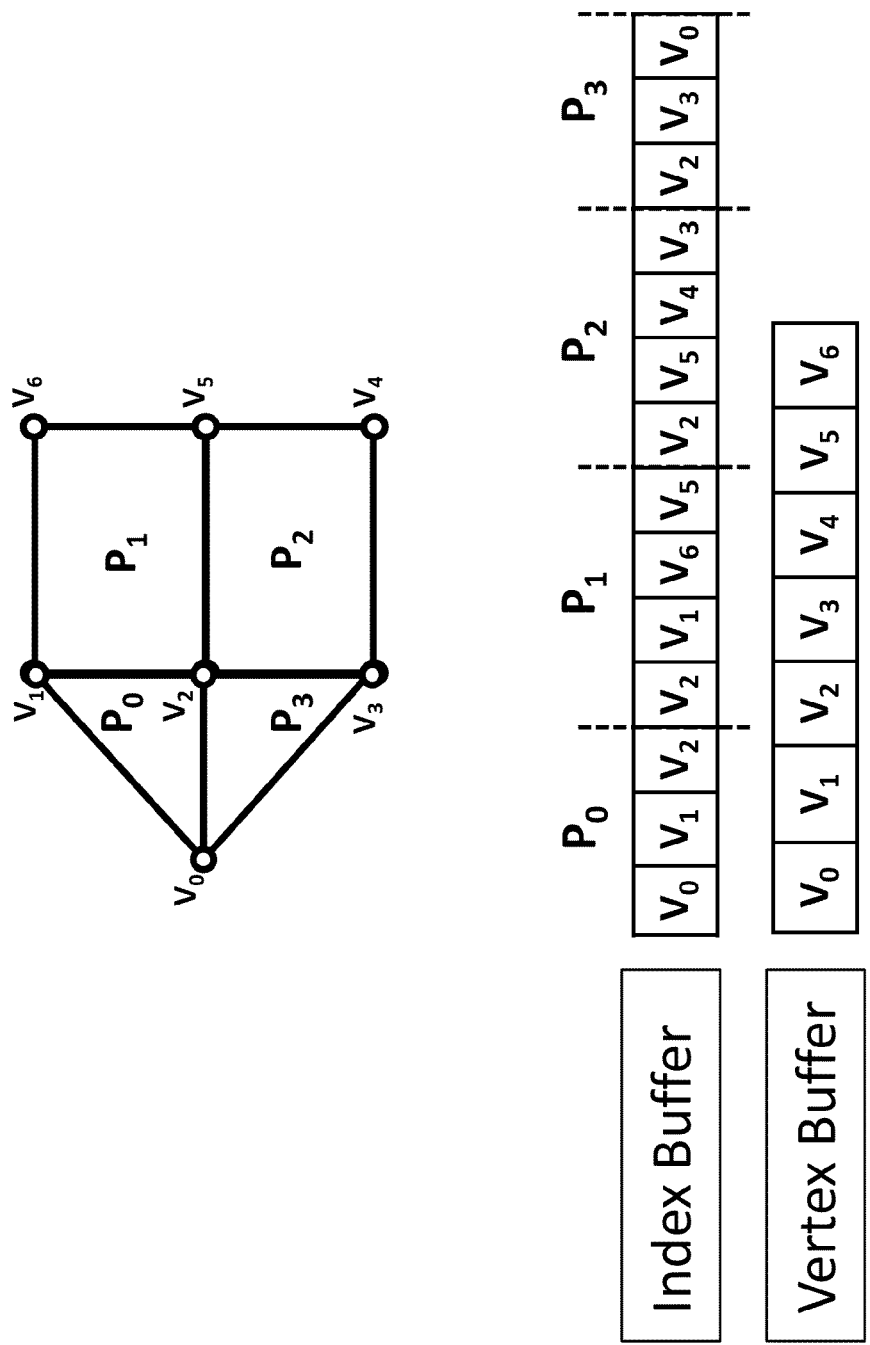
FIG. 10 is a conceptual diagram illustrating an example mesh that includes two triangles and two quads, an example index buffer corresponding to the mesh, and an example vertex buffer corresponding to the mesh.

FIG. 10 is a conceptual diagram illustrating an example mesh that includes two (2) triangles and two (2) quads, an example index buffer corresponding to the mesh, and an example vertex buffer corresponding to the mesh. The vertex buffer shown in FIG. 10 stores seven vertex data structures ($v_0, v_1, \ldots, v_6$) each of which is indicative of a vertex to be rendered. The index buffer shown in FIG. 10 maps an index slot for each of the primitives to be rendered to a corresponding vertex data structure in the vertex buffer. For example, three index slots are included in the index buffer for primitive $P_0$, and the index buffer maps the three index slots to vertex data structures, $v_0$, $v_1$, and $v_2$, respectively, in the vertex buffer. Similarly, four index slots are included in the index buffer for primitive $P_1$, and the index buffer maps the four index slots to vertex data structures, $v_2, v_1, v_6$, and $v_5$, respectively, in the vertex buffer. The number of vertices mapped to primitives $P_0$ and $P_1$ is different because $P_0$ is a triangle and $P_1$ is a quad. As shown in FIG. 10, because of the different numbers of vertices in the primitives, the starting vertices of the primitives in the index buffer are not spaced at regular intervals, so the draw call may not be able to be split without further analyzing the data to determine where the primitive boundaries may occur.

According to some aspects of this disclosure, a data format specification for transferring primitive data between a higher-level software application and a graphics driver may specify a universal primitive data unit size to be used for defining primitives in the primitive data. The universal primitive data unit size may indicate the size of data unit that is to be used for storing data indicative of a primitive to be rendered. The primitive data unit size may be universal in that the sense that it applies to all of the different primitive types that are to be rendered during a single draw call. If a particular primitive does not need all of the data specified by the universal primitive data unit size, the data format specification may require that the higher-level software application pad the primitive data with enough data so that the amount of data stored for that particular primitive is equal to the universal primitive data unit size.

In some examples, instead of specifying a universal primitive size for each of the primitives to be rendered, the data format specification may specify a universal number of vertices to be used for defining each primitive to be rendered. The universal number of vertices to be used for defining each primitive may indicate the number of vertices that are to be used for defining a primitive to be rendered. The number of vertices may be universal in that the sense that it applies to all of the different primitive types that are to be rendered during a single draw call. If a particular primitive does not need all of the vertices specified by the universal number of vertices, the data format specification may require that the higher-level software application pad the primitive data with enough vertices so that the amount of data stored for that particular primitive is equal to the universal number of vertices.

Figure 11:
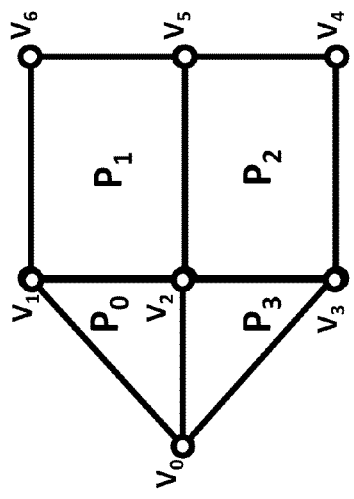
FIG. 11 is a conceptual diagram illustrating the example mesh of FIG. 10 and an example index buffer that includes padded indices and a primitive type Boolean variable to enable the splitting of draw calls in cases where different primitive types may be rendered during the same draw call.
Figure 11:
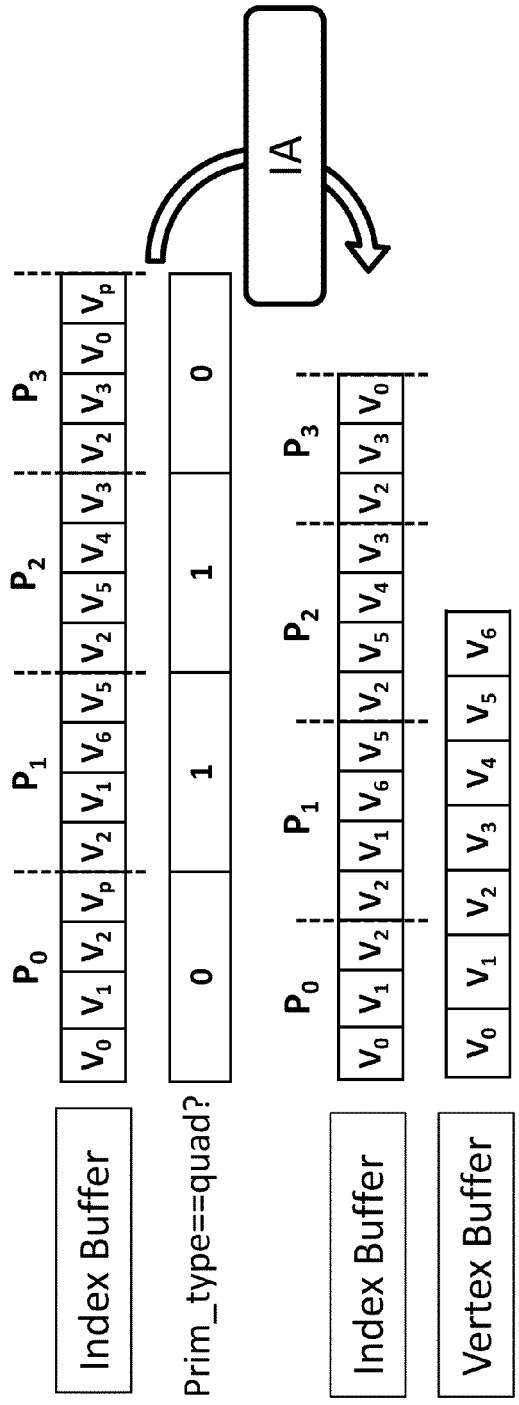

FIG. 11 is a conceptual diagram illustrating the example mesh of FIG. 10 and an example index buffer that includes padded indices and a primitive type Boolean variable to enable the splitting of draw calls in cases where different primitive types may be rendered during the same draw call. As shown in FIG. 11, one padded index (i.e., $v_p$) may be added for each triangle before the IA stage, and the IA stage may drop the padded index if the IA determines that the primitive type is a triangle. In examples where only a triangle and a quad primitive are rendered during a single draw call, one Boolean value per primitive may be used as shown in FIG. 11. In the example of FIG. 11, the Boolean value is set to true (i.e., "1") if the primitive is a quad, and set to false (i.e., "0") if the primitive is a triangle. In other examples, multiple bits may be used to indicate more than two different primitive types.

The overhead for padded indices may be, in some examples, at most a 34% increase in the index buffer. For example, for a mesh consisting of 99 triangles and 1 quad, the size of the original index buffer may be 301 (99*3+1*4). With padded indices, the size may increase up to 400 (99*4+1*4). This is an extreme case, and typically most 3D meshes are quad-dominant with small numbers of isolated triangles.

As shown in FIG. 11, the IA stage (e.g., input assembler 54) may be configured to selectively discard vertices of one or more primitives to be rendered based on data indicative of the type of primitive to be rendered. In the specific example of FIG. 11, the IA stage may receive a set of four vertices for each of the primitives to be rendered as part of a draw call. In response to receiving a set of vertices associated with each of the primitives to be rendered, the IA stage may determine whether the data indicative of the type of primitive to be rendered for the respective primitive indicates that the respective primitive is a triangle.

If the data indicative of the type of primitive to be rendered for the respective primitive indicates that the respective primitive is a triangle, then the IA stage may discard the last vertex included in the set of vertices associated with the respective primitive. Otherwise, if the data indicative of the type of primitive to be rendered for the respective primitive indicates that the respective primitive is a quad, then the IA stage may not discard the last vertex included in the set of vertices associated with the respective primitive. Discarding unnecessary vertices at the IA stage may reduce the number of instantiations of the geometry processing pipeline. By discarding vertices in this manner, additional vertices may be added to the input primitive data to allow draw calls to be efficiently split on the driver side when rendering primitives of different primitive types without causing an increase in the number of instantiations of the geometry processing pipeline.

The technique shown in FIG. 11 may be generalized to draw calls that are performed with respect to more than two different primitive types. In general, the IA stage may determine how many vertices to discard based on the data indicative of the type of primitive to be rendered, and discard the determined number of vertices based on the determination. If the actual number of vertices needed to represent a primitive is equal to the universal number of vertices, then the IA stage may determine to discard no vertices (i.e., zero vertices). If the actual number of vertices needed to represent a primitive is less than the universal number of vertices, then the IA stage may determine to discard the difference between the universal number of vertices and the actual number of vertices needed to represent a primitive. The position of the padded vertices may be anywhere in the data structure and need not necessarily be at the end of the set of vertices as is shown in FIG. 11.

In some examples, discarding a vertex may include reading the data included in an index slot of the index buffer, but not retrieving the corresponding vertex from the vertex buffer. In such examples, not discarding a vertex (or discarding zero vertices) may include reading the data included in an index slot of the index buffer, and retrieving the corresponding vertex from the vertex buffer based on the data read from the index slot of the index buffer.

In further examples, discarding a vertex may include reading the data included in an index slot of the index buffer, retrieving the corresponding vertex from the vertex buffer based on the data read from the index slot of the index buffer, but not passing the retrieved vertex on to one or more subsequent processing stages of the graphics pipeline (e.g., vertex shader 56). In such examples, not discarding a vertex (or discarding zero vertices) may include reading the data included in an index slot of the index buffer, retrieving the corresponding vertex from the vertex buffer based on the data read from the index slot of the index buffer, and passing the retrieved vertex on to one or more subsequent processing stages of the graphics pipeline (e.g., vertex shader 56).

Figure 12:
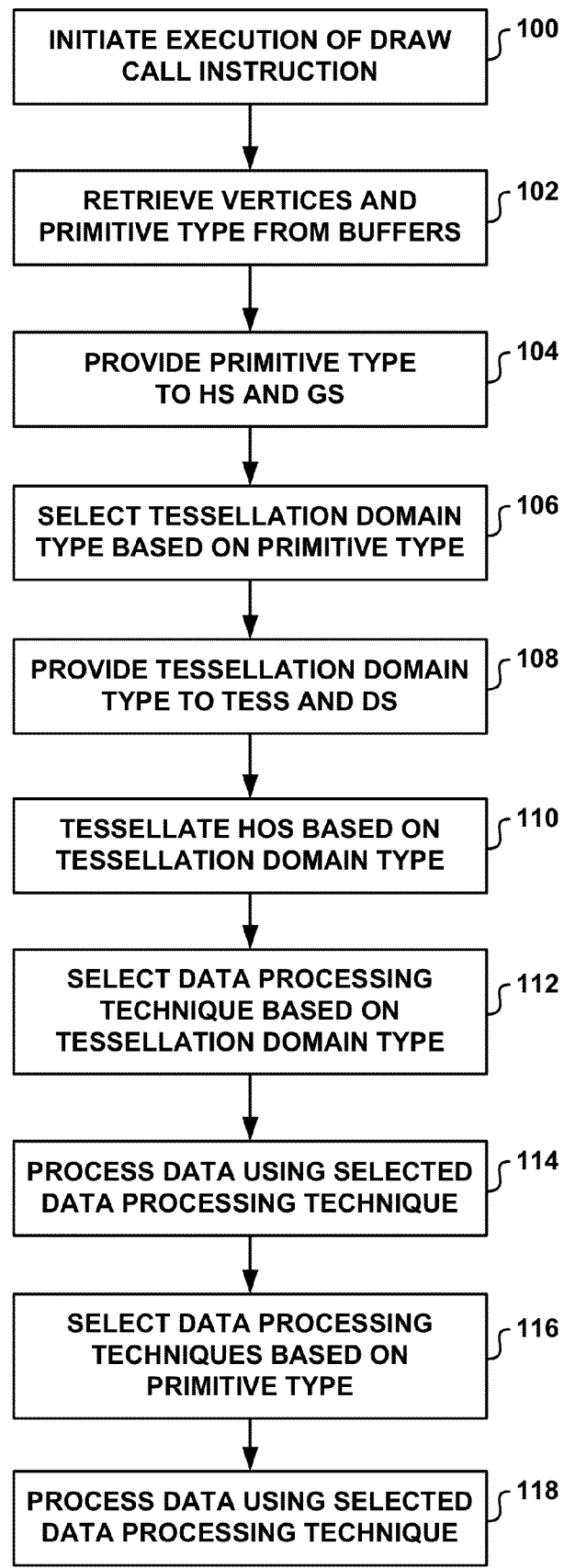
FIG. 12 is a flow diagram illustrating an example technique for rendering at least two different types of primitives using at least two different tessellation domain types during the execution of a single draw call instruction.

FIG. 12 is a flow diagram illustrating an example technique for rendering at least two different types of primitives using at least two different tessellation domain types during the execution of a single draw call instruction. The technique shown in FIG. 12 is described as being performed by GPU 12 shown in FIGS. 1 & 2 and/or graphics pipeline 50 shown in FIG. 3 for exemplary purposes. In other examples, the technique illustrated in FIG. 12 may be implemented in other systems that have same or different components in the same or a different configuration.

GPU 12 initiates execution of a draw call instruction (100). Input assembler 54 retrieves vertices and a primitive type indicator for each of the vertices from one or more buffers (102). For each of the vertices, the primitive type indicator for the respective vertex may include data indicative of a primitive type of a primitive to be rendered that is associated with the respective vertex. In some examples, input assembler 54 may retrieve the vertices from a vertex buffer and the primitive type indicators from a primitive type buffer. Other buffer combinations are possible. The buffers may be stored, for example, in memory 10 and/or resources block 52. Input assembler 54 provides the primitive type indicator to hull shader 58 and to geometry shader 64 (104).

Hull shader 58 selects a tessellation domain type for the primitive to be rendered based on the primitive type of the primitive to be rendered (106). Hull shader 58 may use the primitive type indicator received from input assembler 54 to determine the primitive type of the primitive to be rendered. Hull shader 58 provides the selected tessellation domain type to tessellator 60 and to domain shader 62 (108). Tessellator 60 tessellates a higher-order surface that corresponds to the primitive to be rendered based on the selected tessellation domain (110). The higher order surface may be defined by a number of control points that corresponds to the input primitive to be rendered (e.g., an n-control point patch list where n is an integer greater than or equal to two).

Domain shader 62 selects a domain shader data processing technique for processing data associated with the primitive to be rendered based on the selected tessellation domain type received from hull shader 58 (112). Domain shader 62 processes data associated with the primitive to be rendered based on the selected domain shader processing technique (114). The data associated with the primitive to be rendered may include control points received from hull shader 58 and normalized coordinates produced by tessellator 60.

Geometry shader 64 selects a geometry shader data processing technique for processing data associated with the primitive to be rendered based on the primitive type of the primitive to be rendered (116). Geometry shader 64 may use the primitive type indicator received from hull shader 58 to determine the primitive type of the primitive to be rendered. Geometry shader 64 processes data associated with the primitive to be rendered based on the selected geometry shader processing technique (118). The data associated with the primitive to be rendered may include vertices received from domain shader 62.

Although not shown in FIG. 12, geometry shader 64 may be further configured to select a rasterization primitive type based on the primitive type of the primitive to be rendered, and generate one or more rasterization primitives of the selected rasterization primitive type. Geometry shader 64 may provide the rasterization primitives and the selected rasterization primitive type to rasterizer 66 for further processing.

Rasterizer 66 may select a rasterization technique from a plurality of rasterization techniques based on the selected rasterization primitive type, and rasterize the rasterization primitives based on the selected rasterization technique. In some examples, each of the rasterization techniques may specify a set of rasterization rules for rasterizing a rasterization primitive of a particular rasterization primitive type.

This disclosure describes techniques for content rendering without necessarily modifying the original content. The content rendering techniques of this disclosure may be used to render higher-order surfaces (HOS), such as, e.g. Bézier patches and non-uniform rational basis splines (NURBS) surfaces.

The techniques of this disclosure may be used, in some examples, in a variety of contexts including for example, smooth surfaces rendering. Representing geometry as HOSs may provide one or more advantages over polygonal, faceted mesh representations. HOSs may represent a model more compactly, may guarantee smooth transitions and silhouettes, and may have more high-level handles to manipulate the shape. Therefore, HOSs are increasingly replacing polyhedral representations in applications such as movie productions or applications that represent game characters. The techniques of this disclosure may be able to handle different domains in single draw call, thereby allowing the rendering of triangular patches and quadrilateral patches to happen during the same draw call.

Another context in which the techniques of this disclosure may be used is to render creases and corners. The "Real-Time Creased Approximate Subdivision Surfaces" paper (Proceedings of the 2009 symposium on Interactive 3D graphics and games (I3D '09)), the entire content of which is incorporated herein by reference, presented an extension of ACC for surfaces with creases and corners which may be useful for many applications. The paper integrated their implementation into Valve's Source game engine and analyzed performance. The first image in FIG. 12 of the above-cited paper illustrates characters from the game Team Fortress 2 modeled as a Catmull-Clark subdivision surface and rendered with the techniques described in the above-mentioned paper. The character and his weapon contain sharp features which may require crease support to render correctly. In the second image in FIG. 12 of the cited paper, the light-colored lines indicate patch edges with tagged crease edges highlighted in green. When polyhedral representations are converted into HOSs, the techniques of this disclosure may be used to adapt the algorithm disclosed in the above-mentioned paper to support creases and corners.

Another context in which the techniques of this disclosure may be used is to perform displacement mapping. For example, whether polyhedral representations are converted to HOSs or not, the displacement mapping may transform the final position evaluated in the DS stage to give surfaces a great sense of depth and detail. Therefore, this technique is currently domain dependent. The techniques of this disclosure, however, may be used to apply displacement mapping on a triangle domain and a quad domain as part of a single draw call.

In some examples, the techniques of this disclosure may be used with an isoline domain to, for example, render Bézier curves (e.g., hair, grass, etc.).

In some examples, the techniques of this disclosure may provide an API extension (and corresponding hardware) which may allow content to be rendered without necessarily modifying it. Generally, 3D content may include quads and triangles which are calculated using subdivision surfaces. Because many graphics pipelines are configured to render only a single primitive type using a single tessellation domain type during a draw call command, the quads and triangles may need to be rendered during separate draw call instructions.

One approach to solve this problem is to replace each triangle by three quadrilaterals by applying Catmull-Clark (CC) subdivision. This approach can solve the problem, but may quadruple the number of patches everywhere else, and may therefore increase the amount of computation fourfold. For example, one step of CC subdivision may turn the Proog and Emo models in a purely quadrilateral mesh with 131K facets. This may affect both memory requirements and CPU-GPU transfer.

Another approach to solve this problem is to convert each of the triangles into a triangular Bézier patch. There are several schemes capable of converting a triangle into a triangular patch. These schemes typically require a separate pass and hence an overhead (sorting primitives by type and no longer preserve primitive order) that is to be avoided in real-time rendering. If the DX11 API is used, then a triangle can be handled by inserting a fake vertex which means modifying input data which could result in asymmetric output.

This disclosure describes a multi-domain tessellation processing system that may be configured to render a plurality of different primitive types using a plurality of different tessellation domain types during a single draw call command. The techniques of this disclosure may enhance the programmability of the HS stage to handle different domains in the same draw call. In some example, triangles may be converted into triangular Bézier patches independently from quads being converted into bi-cubic Bézier patches. In some examples, the techniques of this disclosure may provide one or more advantages including, for example: (1) You render what you create: a content creator may never need to explode the data or manipulate to fit in GPU; (2) Single draw call: generic HS handling both primitive types (tri and quad); and (3) No fake vertices need to be introduced.

The three control point patch and the four control point patch described in this disclosure may be alternatively referred to, respectively, as a three control point patch list and a four control point patch list. In some examples, the techniques of this disclosure may allow, during a single draw call, multiple different primitive types to be rendered and multiple different tessellation domain types to be used for tessellating the primitives to be rendered.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:
1. A method comprising:
executing, with a graphics processing unit (GPU), a draw call command;
receiving, with the GPU, graphics data for a plurality of primitives during execution of the draw call command, the plurality of primitives including at least two different types of primitives;
rendering, with the GPU, a first subset of the plurality of primitives based on a first tessellation domain type during execution of the draw call command; and rendering, with the GPU, a second subset of the plurality of primitives based on a second, different tessellation domain type during execution of the same draw call command.

2. The method of claim 1, further comprising:
selecting, with a shader program executing on a shader unit of the GPU, the first tessellation domain type based on a primitive to be rendered being of a primitive type of the first subset,
wherein rendering the first subset comprises rendering, with the GPU, the primitive based on the selection of the first tessellation domain type.

3. The method of claim 2, wherein the shader program comprises at least one of a hull shader program and a tessellation evaluation shader program.

4. The method of claim 2, further comprising:
providing, with the shader program executing on the shader unit of the GPU, the selected tessellation domain type to one or more processing stages in a graphics pipeline of the GPU that are different than a processing stage that executes the shader program,
wherein rendering the primitive based on the selection of the first tessellation domain type comprises rendering, with at least the one or more processing stages, the primitive based on the selection of the first tessellation domain type.

5. The method of claim 4, wherein the one or more processing stages comprise at least one of a domain shader stage, a tessellator stage, and a geometry shader stage.

6. The method of claim 2, further comprising:
selecting, with at least one of a domain shader program and a geometry shader program executing on the shader unit of the GPU, a data processing technique from a plurality of data processing techniques based on the selection of the first tessellation domain type,
wherein rendering the primitive comprises processing, with the at least one of the domain shader program and the geometry shader program executing on the shader unit of the GPU, data associated with the primitive based on the selected data processing technique.

7. The method of claim 2, further comprising:
determining, with one or more shader programs executing on a shader unit of the GPU, whether the primitive to be rendered is a three control point patch primitive or a four control point patch primitive,
wherein selecting the first tessellation domain type comprises selecting, with the one or more shader programs executing on the shader unit of the GPU, a triangle tessellation domain type in response to determining that the primitive to be rendered is a three control point patch primitive.

8. The method of claim 1, wherein the first tessellation domain type comprises a triangle tessellation domain type, and wherein the second tessellation domain type comprises a quadrilateral tessellation domain type.

9. The method of claim 1, further comprising:
determining, with one or more shader programs executing on a shader unit of the GPU, whether a primitive to be rendered is a three control point patch primitive or a four control point patch primitive;
generating, with the GPU, a plurality of triangle primitives that approximate the curvature of a triangular Bezier patch surface defined by control points of the primitive to be rendered in response to determining that the primitive to be rendered is a three control point patch primitive; and generating, with the GPU, a plurality of triangle primitives that approximate the curvature of a bi-cubic Bezier patch surface defined by control points of the primitive to be rendered in response to determining that the primitive to be rendered is a four control point patch primitive.

10. The method of claim 1, further comprising:
receiving, with a GPU, from a host device first data indicative of a primitive type for each of a plurality of vertices to be rendered;
providing, with the GPU, second data indicative of the primitive type of each of the plurality of vertices to be rendered to one or more processing stages in a graphics rendering pipeline of the GPU.

11. The method of claim 10, wherein the second data indicative of the primitive type comprises a system-generated value that is generated by an input assembler stage of the graphics rendering pipeline of the GPU.

12. A device comprising:
a memory configured to store graphics data for a plurality of primitives; and
a graphics processing unit (GPU) configured to:
execute a draw call command;
receive, from the memory, during execution of the draw call command, the graphics data for the plurality of primitives, the graphics data being graphics data for primitives including at least two different types of primitives;
render a first subset of the plurality of primitives based on a first tessellation domain type during execution of the draw call command; and
render a second subset of the plurality of primitives based on a second, different tessellation domain type during execution of the same draw call command.

13. The device of claim 12,
wherein the GPU comprises one or more shader units configured to execute a shader program that causes the one or more shader units to select the first tessellation domain type based on a primitive to be rendered being of a primitive type of the first subset, and
wherein, to render the first subset, the GPU is further configured to render the primitive based on the selected selection of the first tessellation domain type.

14. The device of claim 13, wherein the shader program comprises at least one of a hull shader program and a tessellation evaluation shader program.

15. The device of claim 13,
wherein the shader program further causes the one or more shader units to provide the selected tessellation domain type to one or more processing stages in a graphics pipeline of the GPU that are different than a processing stage that executes the shader program, and
wherein, to render the primitive based on the selection of the first tessellation domain type, the GPU is further configured to render, using at least the one or more processing stages, the primitive based on the selection of the first tessellation domain type.

16. The device of claim 15, wherein the one or more processing stages comprise at least one of a domain shader stage, a tessellator stage, and a geometry shader stage.

17. The device of claim 13, wherein the one or more shader units are further configured to execute at least one of a domain shader program and a geometry shader program that causes the one or more shader units to:
select a data processing technique from a plurality of data processing techniques based on the selection of the first tessellation domain type; and process data associated with the primitive based on the selected data processing technique.

18. The device of claim 13, wherein the GPU comprises one or more shader units configured to execute a shader program that causes the one or more shader units to:
   determine whether the primitive to be rendered is a three control point patch primitive or a four control point patch primitive,
   wherein, to select the first tessellation domain type, the one or more shader units are configured to select a triangle tessellation domain type in response to determining that the primitive to be rendered is a three control point patch primitive.

19. The device of claim 12, wherein the first tessellation domain type comprises a triangle tessellation domain type and the second tessellation domain type comprises a quadrilateral tessellation domain type.

20. The device of claim 12,
   wherein the GPU comprises one or more shader units configured to execute a shader program that causes the one or more shader units to determine whether a primitive to be rendered is a three control point patch primitive or a four control point patch primitive, and
   wherein the GPU is further configured to:
   generate a plurality of triangle primitives that approximate the curvature of a triangular Bezier patch surface defined by control points of the primitive to be rendered in response to the one or more shader units determining that the primitive to be rendered is a three control point patch primitive; and
   generating a plurality of triangle primitives that approximate the curvature of a bi-cubic Bezier patch surface defined by control points of the primitive to be rendered in response to the one or more shader units determining that the primitive to be rendered is a four control point patch primitive.

21. The device of claim 12, wherein the GPU is further configured to receive from a host device first data indicative of a primitive type for each of a plurality of vertices to be rendered, and to provide second data indicative of a primitive type of each of the plurality of vertices to be rendered to one or more processing stages in a graphics rendering pipeline of the GPU.

22. The device of claim 21, wherein the second data indicative of the primitive type comprises a system-generated value that is generated by an input assembler stage of the graphics rendering pipeline of the GPU.

23. The device of claim 12, wherein the device comprises a wireless communication device.

24. The device of claim 12, wherein the device comprises a mobile phone handset.

25. An apparatus comprising:
   means for executing a draw call command;
   means for receiving graphics data for a plurality of primitives during execution of the draw call command, the plurality of primitives including at least two different types of primitives; and
   means for rendering a first subset of the plurality of primitives based on a first tessellation domain type during execution of the draw call command; and
   means for rendering a second subset of the plurality of primitives based on a second, different tessellation domain type during execution of the same draw call command.

26. A non-transitory computer readable storage medium storing instructions that upon execution by one or more processors cause the one or more processors to:
   execute a draw call command;
   receive graphics data for a plurality of primitives during execution of the draw call command, the plurality of primitives including at least two different types of primitives;
   render a first subset of the plurality of primitives based on a first tessellation domain type during execution of the draw call command; and
   render a second subset of the plurality of primitives based on a second, different tessellation domain type during execution of the same draw call command.

* * * * *